(12) United States Patent
Heo et al.

(10) Patent No.: US 11,486,912 B2
(45) Date of Patent: Nov. 1, 2022

(54) GLITCH DETECTOR, SECURITY DEVICE INCLUDING THE SAME AND ELECTRONIC SYSTEM INCLUDING THE SAME

(71) Applicant: Samsung Electronics Co., Ltd., Suwon-si (KR)

(72) Inventors: Donghun Heo, Hwaseong-si (KR); Sangjin Lim, Osan-si (KR); Cheolhwan Lim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 39 days.

(21) Appl. No.: 17/314,693

(22) Filed: May 7, 2021

(65) Prior Publication Data

US 2022/0137104 A1 May 5, 2022

(30) Foreign Application Priority Data

Oct. 30, 2020 (KR) .................. 10-2020-0142907

(51) Int. Cl.
| | |
|---|---|
| G01R 19/165 | (2006.01) |
| H03K 3/037 | (2006.01) |
| G06F 21/55 | (2013.01) |
| H03K 17/687 | (2006.01) |
| H03K 5/24 | (2006.01) |

(52) U.S. Cl.
CPC ..... G01R 19/16533 (2013.01); G06F 21/556 (2013.01); H03K 3/037 (2013.01); H03K 5/24 (2013.01); H03K 17/6872 (2013.01)

(58) Field of Classification Search
CPC ........ G06F 21/755; G06F 21/556; G06F 1/24; G01R 19/16533; H03K 17/6872; H03K 17/22; H03K 5/24; H03K 3/037; H03K 5/2481

USPC .......................................................... 327/77
See application file for complete search history.

(56) References Cited

U.S. PATENT DOCUMENTS

| | | |
|---|---|---|
| 7,085,979 B2 | 8/2006 | Kim et al. |
| 7,449,921 B2 | 11/2008 | Jeung |
| 7,483,328 B2 | 1/2009 | Kim et al. |
| 10,015,609 B2 | 7/2018 | Kropfitsch et al. |
| 10,156,595 B2 | 12/2018 | Nirwan et al. |
| 2003/0226082 A1* | 12/2003 | Kim .................... G06K 19/073 714/734 |
| 2017/0032125 A1 | 2/2017 | Lee et al. |

FOREIGN PATENT DOCUMENTS

JP       2000162290 A       6/2000

* cited by examiner

Primary Examiner — Quan Tra
Assistant Examiner — Ahn-Quan Tra
(74) Attorney, Agent, or Firm — Muir Patent Law, PLLC

(57) ABSTRACT

A glitch detector includes a sensing circuit, a glitch-to-pulse generator and a comparing circuit. The sensing circuit generates a glitch voltage and at least one reference voltage based on a first power supply voltage. The glitch-to-pulse generator receives the first power supply voltage or the glitch voltage, and generates at least one pulse voltage including a pulse when the glitch occurs on the first power supply voltage. The comparing circuit generates at least one detection voltage by comparing the glitch voltage with the at least one reference voltage based on the pulse included in the at least one pulse voltage. The at least one detection voltage is activated when the glitch occurs on the first power supply voltage.

20 Claims, 16 Drawing Sheets

GLITCH DETECTOR, SECURITY DEVICE INCLUDING THE SAME AND ELECTRONIC SYSTEM INCLUDING THE SAME

CROSS-REFERENCE TO RELATED APPLICATION

This application claims priority under 35 USC § 119 to Korean Patent Application No. 10-2020-0142907 filed on Oct. 30, 2020 in the Korean Intellectual Property Office (KIPO), the entire contents of which are herein incorporated by reference in their entirety.

BACKGROUND

1. Technical Field

Example embodiments relate generally to semiconductor integrated circuits, and more particularly to glitch detectors, security devices including the glitch detectors, and electronic systems including the security devices.

2. Description of the Related Art

Recently, a security device to process and/or store security data has been widely used. Data stored within the security device should be securely and safely retained, but the stored data may be vulnerable to an attacker during data transmission. For example, if an attacker directly monitors signals in the security device to ascertain data stored therein, the monitored data may be "leaked" to the attacker. Therefore, the security device may include detectors to detect abnormal conditions (e.g., abnormal voltage, frequency, temperature, glitches, light exposure, etc.). For example, the security device may include a glitch detector. The glitch detector may be used to detect the abnormal conditions, and may not affect an operation of the security device under normal conditions.

SUMMARY

At least one example embodiment of the present disclosure provides a glitch detector with relatively low static current consumption.

At least one example embodiment of the present disclosure provides a security device including the glitch detector.

At least one example embodiment of the present disclosure provides an electronic system including the security device.

According to example embodiments, a glitch detector includes a sensing circuit, a glitch-to-pulse generator and a comparing circuit. The sensing circuit generates a glitch voltage and at least one reference voltage based on a first power supply voltage. The glitch-to-pulse generator receives the first power supply voltage or the glitch voltage, and generates at least one pulse voltage including a pulse when the glitch occurs on the first power supply voltage. The comparing circuit generates at least one detection voltage by comparing the glitch voltage with the at least one reference voltage in response to the pulse of the pulse voltage.

According to example embodiments, a security device includes a security memory, a security processor, a glitch detector and a reset signal generation circuit. The security memory stores security data. The security processor processes the security data, and is reset based on a reset signal. The glitch detector generates at least one detection voltage that is activated when a glitch occurs on a first power supply voltage. The reset signal generation circuit generates the reset signal based on the at least one detection voltage.

According to example embodiments, an electronic system includes a processor and a security device. The processor controls a normal operation. The security device controls a security operation. The security device includes a security memory, a security processor, a glitch detector and a reset signal generation circuit. The security memory stores security data. The security processor processes the security data, and is reset based on a reset signal. The glitch detector generates at least one detection voltage that is activated when a glitch occurs on a first power supply voltage. The reset signal generation circuit generates the reset signal based on the at least one detection voltage.

According to example embodiments, a glitch detector includes a sensing circuit, a reference voltage generating circuit, a glitch-to-pulse generation circuit and a comparing circuit. The sensing circuit generates a glitch voltage based on a first power supply voltage. The reference voltage generating circuit generates at least one of a first reference voltage and a second reference voltage based on the first power supply voltage. The second reference voltage is lower than the first reference voltage. The glitch-to-pulse generation circuit receives the first power supply voltage or the glitch voltage, and generates a pulse when the glitch occurs on the first power supply voltage. The comparing circuit compares the glitch voltage with at least one of the first and second reference voltages in response to receiving the pulse. The glitch-to-pulse generator includes at least one of a first glitch-to-pulse generating circuit and a second glitch-to-pulse generating circuit. The first glitch-to-pulse generating circuit generates a first pulse voltage in response to sensing an up-glitch higher than the first reference voltage. The second glitch-to-pulse generating circuit generates a second pulse voltage in response to sensing a down-glitch lower than the second reference voltage. The comparing circuit includes at least one of a first latch-type comparator and a second latch-type comparator. The first latch-type comparator generates a first detection voltage by comparing the glitch voltage with the first reference voltage only when the first pulse voltage is activated, the first detection voltage being activated when the up-glitch occurs. The second latch-type comparator generates a second detection voltage by comparing the glitch voltage with the second reference voltage only when the second pulse voltage is activated, the second detection voltage being activated when the down-glitch occurs.

The glitch detector according to example embodiments may include the sensing circuit for sensing the glitch, the glitch-to-pulse generator for generating the pulse when the glitch occurs, and the comparing circuit for performing the comparison operation and the glitch detection operation. In addition, the comparing circuit may include the latch-type comparator. The latch-type comparator may not operate based on a clock signal that periodically toggles, but may operate in response to receiving the pulse voltage that is generated from the glitch-to-pulse generator. In the glitch detector, the pulse may be generated only at the moment when the glitch occurs, the comparison operation may be performed based on the pulse, and thus the glitch may be rapidly detected or sensed only at the desired moment. Accordingly, the static current and power consumption may be reduced during a normal operation in which the glitch does not occur.

In addition, the security device and the electronic system according to example embodiments may include the glitch detector according to example embodiments. Accordingly, the leakage, destruction or alteration of the security data caused by an external attack may be prevented, the security device and the electronic system may securely and/or safely protect the security data, and the security device and the electronic system may have the improved or enhanced security performance.

BRIEF DESCRIPTION OF THE DRAWINGS

Illustrative, non-limiting example embodiments will be more clearly understood from the following detailed description taken in conjunction with the accompanying drawings.

DETAILED DESCRIPTION OF THE EMBODIMENTS

Figure 1:
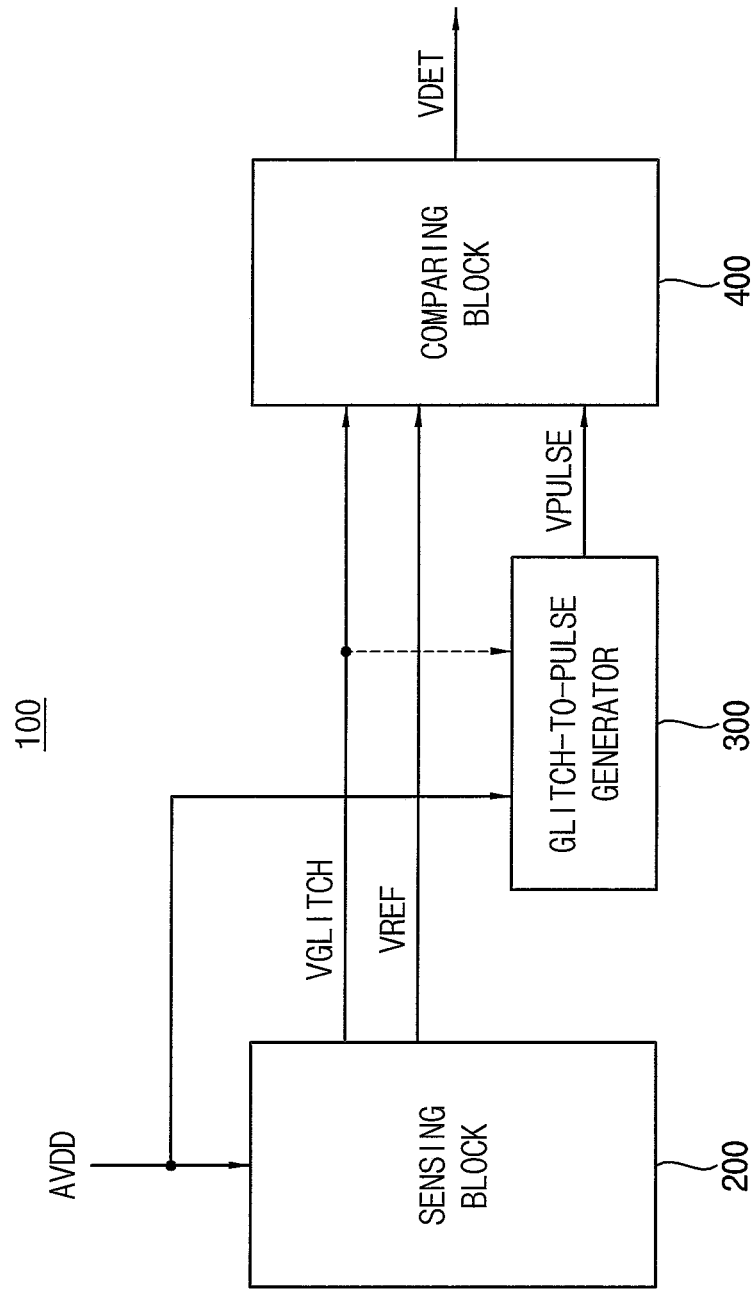
FIG. 1 is a block diagram illustrating a glitch detector according to example embodiments.

Various example embodiments will be described more fully with reference to the accompanying drawings, in which embodiments are shown. The present disclosure may, however, be embodied in many different forms and should not be construed as limited to the embodiments set forth herein. Like reference numerals refer to like elements throughout this application.

FIG. 1 is a block diagram illustrating a glitch detector according to example embodiments.

Referring to FIG. 1, a glitch detector 100 includes a sensing circuit 200, a glitch-to-pulse generator 300 (a circuit) and a comparing circuit 400.

The sensing circuit 200 generates a glitch voltage VGLITCH and at least one reference voltage VREF based on a first power supply voltage AVDD. For example, the sensing circuit 200 may include a sensing circuit that generates the glitch voltage VGLITCH, and a reference voltage generating circuit that generates the at least one reference voltage VREF. It should be appreciated that reference to generation of a glitch voltage VGLITCH refers to generation of a voltage that represents the presence or absence of a glitch of the first power supply voltage AVDD (or other power supply being monitored for a glitch). Thus, glitch voltage VGLITCH may be generated without any glitches in normal/typical operations (i.e., when the first power supply voltage AVDD is provided normally without any glitch, glitch voltage VGLITCH may be generated also without a glitch).

The first power supply voltage AVDD may be a voltage that is used to drive or operate electronic devices and/or systems including the glitch detector 100. For example, the first power supply voltage AVDD may be an analog power supply voltage. The first power supply voltage AVDD may be an external power supply voltage that is provided to the security device, such as to a terminal of a semiconductor chip or a package containing multiple semiconductor chips. The first power supply voltage AVDD may also be an internal power supply voltage that is generated by the security device from a voltage source of the security device (e.g., by an on-chip voltage regulator circuit that provides the internal voltage by regulating an external voltage provided to a semiconductor chip). The first power supply voltage AVDD may be provided to various internal circuits of the security device to power and operate the same (e.g., provided to circuits of a semiconductor chip that form part of the integrated circuit of the semiconductor chip). The glitch voltage VGLITCH may be a voltage corresponding to the first power supply voltage AVDD. For example, the glitch voltage VGLITCH may have a waveform substantially the same as that of the first power supply voltage AVDD. For example, a glitch occurring in the first power supply voltage AVDD may be represented as a corresponding glitch in the glitch voltage VGLITCH. The at least one reference voltage VREF may be a voltage that is used to sense and/or detect a glitch of the first power supply voltage AVDD. For example, the at least one reference voltage VREF may include a first reference voltage and a second reference voltage. The second reference voltage may be lower than the first reference voltage.

The glitch-to-pulse generator 300 receives the first power supply voltage AVDD or the glitch voltage VGLITCH, and generates at least one pulse voltage VPULSE including a pulse by generating the pulse in response to the glitch when the glitch occurs on the first power supply voltage AVDD (e.g., at the moment when the glitch occurs on the first power supply voltage AVDD).

For example, the glitch of the first power supply voltage AVDD may include an up-glitch (or a positive glitch) higher than the first reference voltage and a down-glitch (or a negative glitch) lower than the second reference voltage. In other words, a voltage level of the up-glitch may be higher than a level of the first reference voltage, and a voltage level of the down-glitch may be lower than a level of the second reference voltage. The glitch-to-pulse generator 300 may include at least one of a first glitch-to-pulse generating circuit and a second glitch-to-pulse generating circuit. The first glitch-to-pulse generating circuit may generate a first pulse voltage in response to sensing the up-glitch. The second glitch-to-pulse generating circuit may generate a second pulse voltage in response to sensing the down-glitch.

The comparing circuit 400 generates at least one detection voltage VDET by comparing the glitch voltage VGLITCH with the at least one reference voltage VREF based on the pulse included in the at least one pulse voltage VPULSE. The at least one detection voltage VDET is activated when the glitch occurs on the first power supply voltage AVDD. For example, the comparing circuit 400 may include a latch-type comparator.

For example, the comparing circuit 400 may include at least one of a first latch-type comparator and a second latch-type comparator. The first latch-type comparator may generate a first detection voltage by comparing the glitch voltage VGLITCH with the first reference voltage only when the first pulse voltage is activated. The first detection voltage may be activated when the up-glitch occurs on the first power supply voltage AVDD. The second latch-type comparator may generate a second detection voltage by comparing the glitch voltage VGLITCH with the second reference voltage only when the second pulse voltage is activated. The second detection voltage may be activated when the down-glitch occurs on the first power supply voltage AVDD.

The glitch detector 100 according to example embodiments may include the sensing circuit 200 for transferring the glitch, the glitch-to-pulse generator 300 for generating the pulse when the glitch occurs, and the comparing circuit 400 for performing the comparison operation and the glitch detection operation. In addition, the comparing circuit 400 may include the latch-type comparator. The latch-type comparator need not operate based on a clock signal that periodically toggles, but may operate based on the pulse voltage that is generated from the glitch-to-pulse generator 300. In the glitch detector 100, the pulse may be generated only at the moment when the glitch occurs, the comparison operation may be performed based on the pulse, and thus the glitch may be rapidly detected or sensed only at the desired moment. Accordingly, the static current and power consumption may be reduced during a normal operation in which the glitch does not occur.

Figure 2:
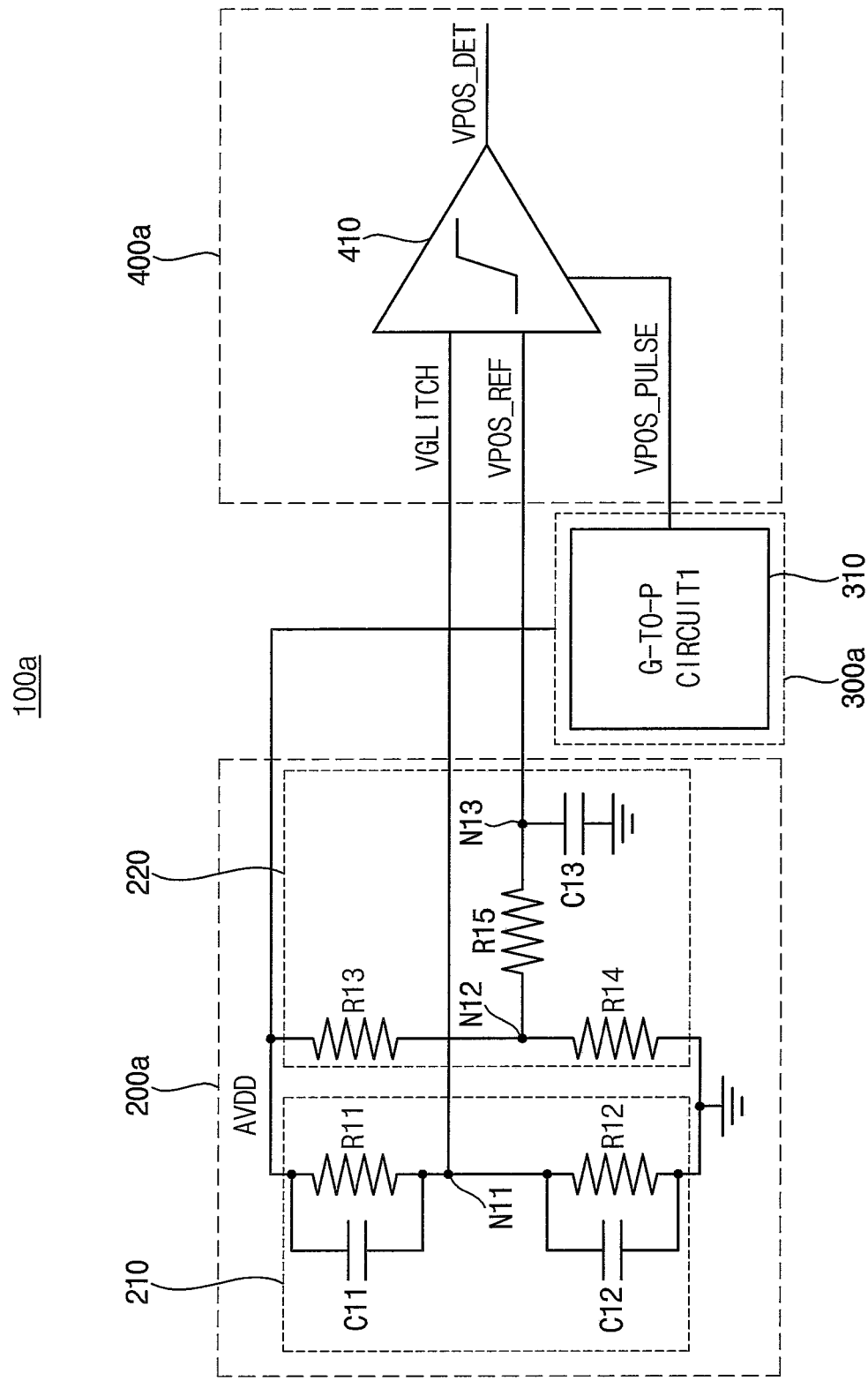
FIG. 2 is a diagram illustrating an example of a glitch detector according to example embodiments.

FIG. 2 is a diagram illustrating an example of a glitch detector according to example embodiments.

Referring to FIG. 2, a glitch detector 100a includes a sensing circuit 200a, a glitch-to-pulse generator 300a and a comparing circuit 400a.

The sensing circuit 200a may include a first circuit 210 and a second circuit 220. The first circuit 210 may generate the glitch voltage VGLITCH based on the first power supply voltage AVDD, and may form a sensor. The second circuit 220 may generate a first reference voltage VPOS_REF based on the first power supply voltage AVDD, and may form the reference voltage generating circuit. The first reference voltage VPOS_REF may be used to detect the up-glitch.

The first circuit 210 may include resistors R11 and R12 and capacitors C11 and C12. The resistors R11 and R12 may be connected in series between the first power supply voltage AVDD and a ground voltage. The capacitors C11 and C12 may be connected in series between the first power supply voltage AVDD and the ground voltage. The resistor R11 and the capacitor C11 may be connected in parallel between the first power supply voltage AVDD and a node N11 outputting the glitch voltage VGLITCH. The resistor R12 and the capacitor C12 may be connected in parallel between the node N11 and the ground voltage.

The second circuit 220 may include resistors R13, R14 and R15 and a capacitor C13. The resistors R13 and R14 may be connected in series between the first power supply voltage AVDD and the ground voltage. The resistor R13 may be connected between the first power supply voltage AVDD and a node N12. The resistor R14 may be connected between the node N12 and the ground voltage. The resistor R15 may be connected between the node N12 and a node N13 outputting the first reference voltage VPOS_REF. The capacitor C13 may be connected between the node N13 and the ground voltage. A level of the first reference voltage VPOS_REF may be determined depending on resistances of the resistors R13 and R14.

The glitch-to-pulse generator 300a may include a first glitch-to-pulse generating circuit (G-TO-P CIRCUIT1) 310. The first glitch-to-pulse generating circuit 310 may generate a first pulse voltage VPOS_PULSE in response to sensing the up-glitch. The upglitch may be sensed and the pulse portion of VPOS_PULSE may be generated in response to the first power supply voltage AVDD increasing by at least a particular magnitude at at least a particular rate. The first glitch-to-pulse generating circuit 310 may be referred to as a positive glitch-to-pulse generating circuit. A detailed configuration of the first glitch-to-pulse generating circuit 310 will be described with reference to FIGS. 4A and 4B.

The comparing circuit 400a may include a first latch-type comparator 410. The first latch-type comparator 410 may generate a first detection voltage VPOS_DET by comparing the glitch voltage VGLITCH with the first reference voltage VPOS_REF only when the first pulse voltage VPOS_PULSE is activated. The first latch-type comparator 410 may be enabled by the activation of first pulse voltage VPOS_PULSE and be disabled otherwise (e.g., when the first pulse voltage VPOS_PULSE is not activated). Activation of the pulse voltages described herein will be understood to correspond to the pulse portion of the pulse voltages (e.g., between t12 and t14 for VPOS_PULSE in FIG. 3), such pulse portions representing an active state (e.g., with a particular logic value) of the overall pulse voltage. A detailed configuration of the first latch-type comparator 410 will be described with reference to FIG. 6.

In some example embodiments, the glitch detector 100a may not receive a clock signal that periodically toggles or swings between a first voltage level and a second voltage level. Typically, a latch-type comparator has a relatively fast operation speed and requires a clock signal for driving, and thus has relatively large current and power consumption. In contrast, the first latch-type comparator 410 included in the glitch detector 100a according to example embodiments may not use a clock signal, may perform the comparison operation in response to receiving a pulse (e.g., the pulse portion of the first pulse voltage VPOS_PULSE) that is generated from the first glitch-to-pulse generating circuit 310 only when a glitch (e.g., the up-glitch) occurs, and thus the glitch that instantaneously or momentarily occurs may be detected with a relatively high speed.

In some example embodiments, the amount of static current consumption by the glitch detector 100a may be less than the predetermined amount of current. For example, the predetermined amount of current may correspond to the amount of static current consumption by a conventional glitch detector. For example, there may be almost no power consumption by the first latch-type comparator 410 during a normal operation in which the glitch does not occur, and there may be the very small amount of power consumption by the first latch-type comparator 410 only when the glitch occurs. Accordingly, the glitch may be efficiently detected while power consumption is reduced.

Figure 3:
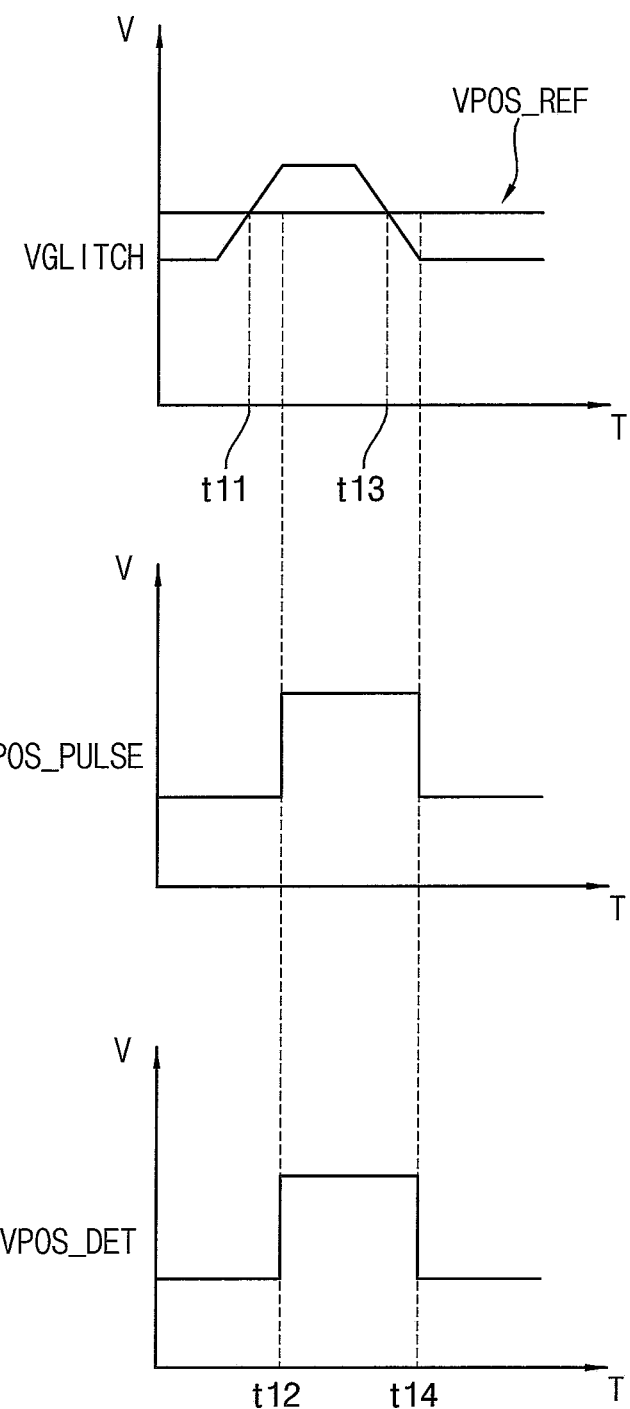
FIG. 3 is a timing diagram for describing an operation of a glitch detector of FIG. 2.

FIG. 3 is a timing diagram for describing an operation of a glitch detector of FIG. 2.

Referring to FIGS. 2 and 3, when an up-glitch occurs on the first power supply voltage AVDD, a level of the glitch voltage VGLITCH that corresponds to the first power supply voltage AVDD may also increase momentarily and then decrease. For example, the level of the glitch voltage VGLITCH may become higher than a level of the first reference voltage VPOS_REF at time t11 and may become lower than the level of the first reference voltage VPOS_REF at time t13.

The first pulse voltage VPOS_PULSE may include a pulse that corresponds to the up-glitch. For example, the first pulse voltage VPOS_PULSE may transition from a low level to a high level at time t12, may transition from the high level to the low level at time t14, and thus may have a pulse of the high level between time t12 and time t14. For example, time t12 may be a time point that is elapsed by a predetermined delay time from time t11, and time t14 may be a time point that is elapsed by the predetermined delay time from time t13. For example, as will be described with reference to FIGS. 4A and 4B, the first glitch-to-pulse generating circuit 310 may include a delay circuit for the predetermined delay time.

The first detection voltage VPOS_DET may have a waveform substantially the same as that of the first pulse voltage VPOS_PULSE. For example, the first detection voltage VPOS_DET may transition from a low level to a high level at time t12, may transition from the high level to the low level at time t14, and thus may maintain the high level between time t12 and time t14. The first detection voltage VPOS_DET at the high level may indicate the occurrence of the up-glitch in the first power supply voltage AVDD.

Figure 4A:
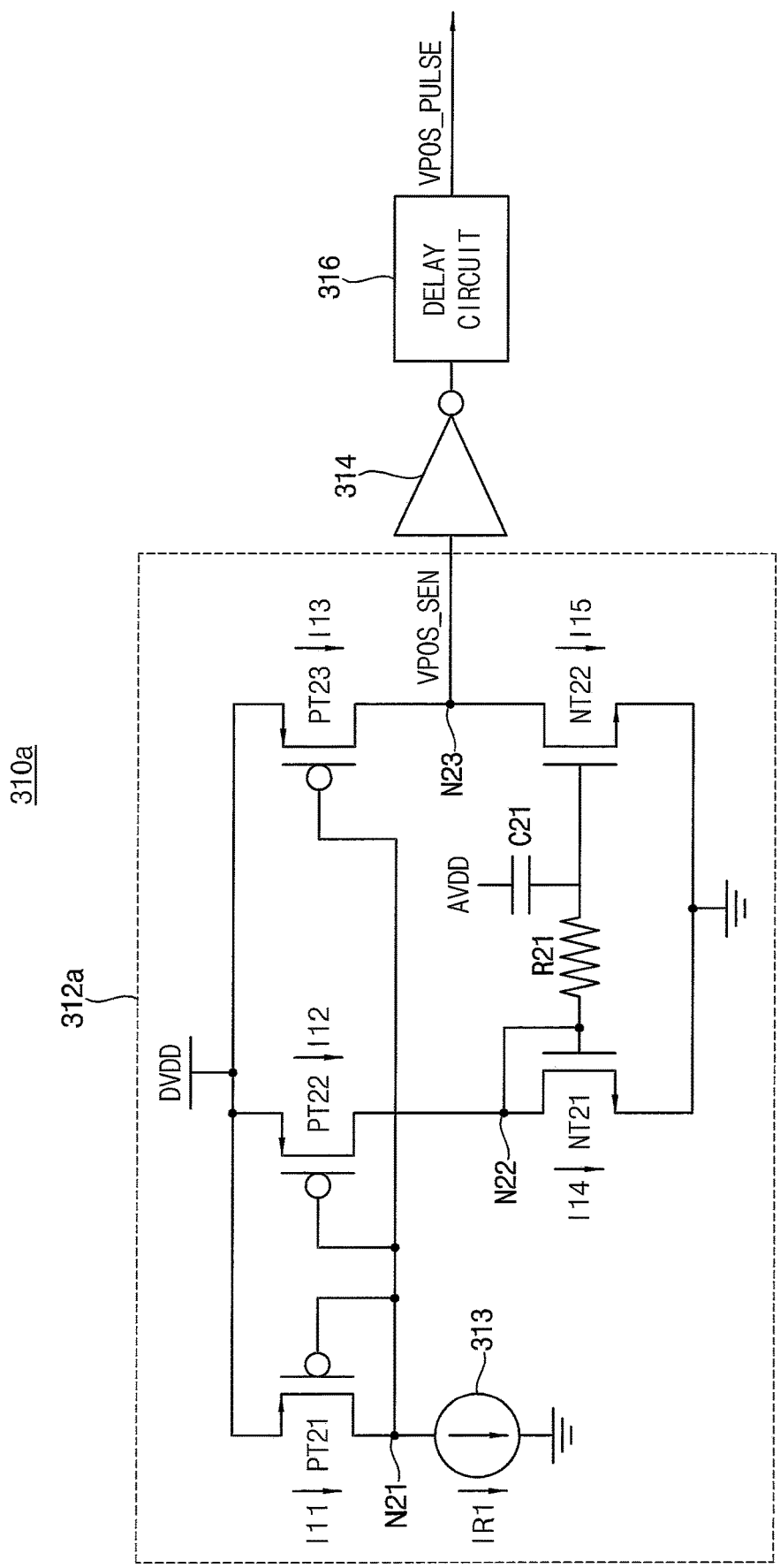
FIGS. 4A and 4B are diagrams illustrating examples of a first glitch-to-pulse generating circuit included in a glitch detector of FIG. 2.
Figure 4B:
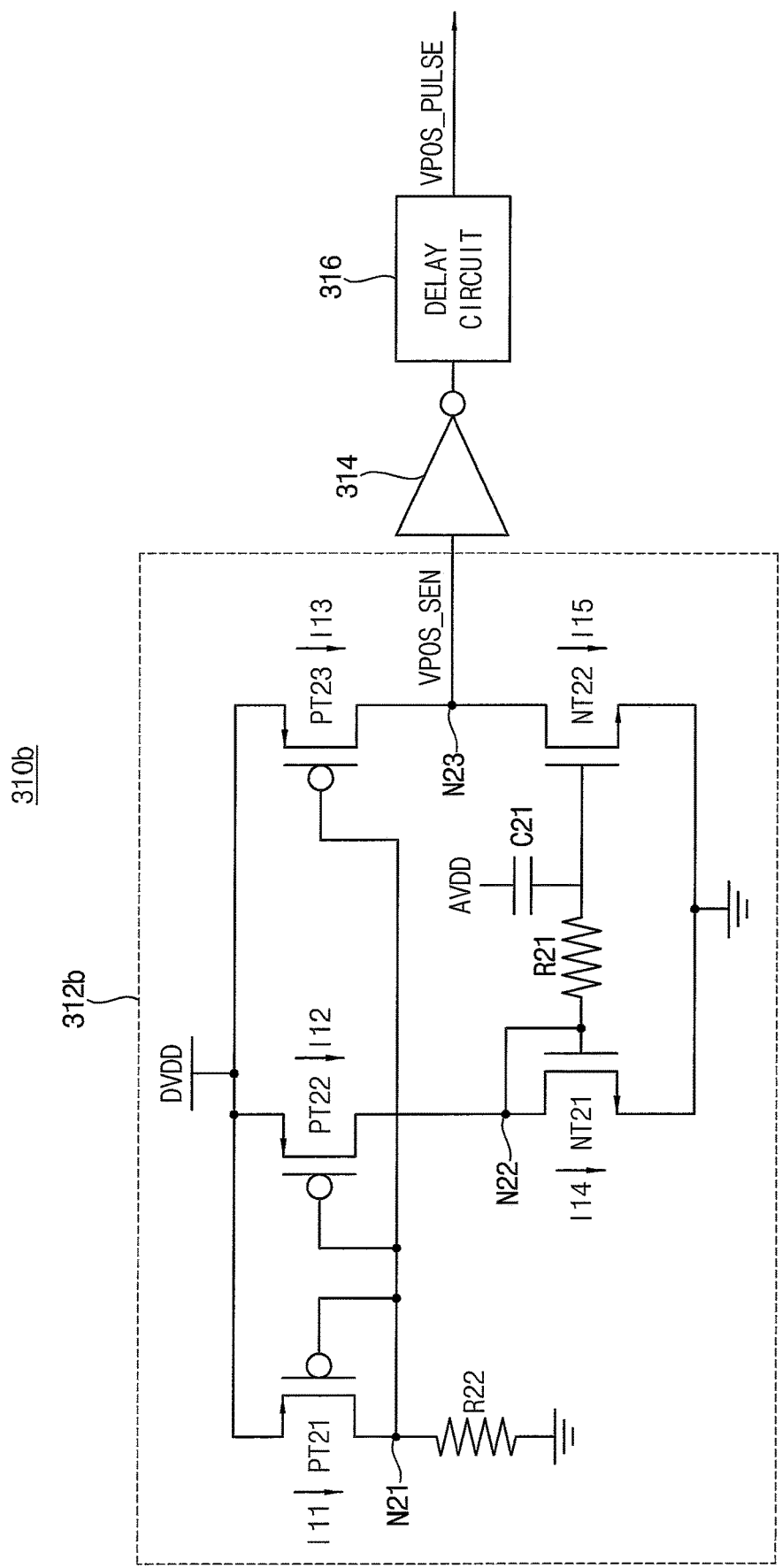

FIGS. 4A and 4B are diagrams illustrating examples of a first glitch-to-pulse generating circuit included in a glitch detector of FIG. 2.

Referring to FIG. 4A, a first glitch-to-pulse generating circuit 310a may include a circuit 312a and an inverter 314. The first glitch-to-pulse generating circuit 310a may further include a delay circuit 316.

The circuit 312a may generate a first sensing voltage VPOS_SEN based on a first reference current IR1, a second power supply voltage DVDD and the first power supply voltage AVDD. Although FIGS. 1, 2 and 4A illustrate an embodiment where circuit 312a receives the first power supply voltage AVDD to generate the first sensing voltage VPOS_SEN, other voltages corresponding to the first power supply voltage AVDD may instead be input to the circuit 312a in place of first power supply voltage AVDD, such as the glitch voltage VGLITCH or other voltage having a waveform derived from and corresponding to the waveform of the first power supply voltage AVDD (and it will be understood that the remaining description of this embodiment equally applies to such a modification). The first sensing voltage VPOS_SEN may be activated when the up-glitch occurs on the first power supply voltage AVDD. FIG. 4A illustrates an example where the circuit 312a operates based on the first power supply voltage AVDD. The second power supply voltage DVDD may be a voltage that is used to drive or operate the circuit 312a. For example, the second power supply voltage DVDD may be a digital power supply voltage.

The circuit 312a may include p-type metal oxide semiconductor (PMOS) transistors PT21, PT22 and PT23, a current source 313, n-type metal oxide semiconductor (NMOS) transistors NT21 and NT22, a resistor R21 and a capacitor C21. The PMOS transistor PT21 may be connected between the second power supply voltage DVDD and node N21, and may have a gate electrode connected to node N21. The PMOS transistor PT22 may be connected between the second power supply voltage DVDD and node N22, and may have a gate electrode connected to node N21. The PMOS transistor PT23 may be connected between the second power supply voltage DVDD and node N23 outputting the first sensing voltage VPOS_SEN, and may have a gate electrode connected to node N21. The current source 313 may be connected between node N21 and the ground voltage, and may generate the first reference current IR1. The NMOS transistor NT21 may be connected between node N22 and the ground voltage, and may have a gate electrode connected to node N22. The NMOS transistor NT22 may be connected between node N23 and the ground voltage, and may have a gate electrode connected to the resistor R21 and the capacitor C21. The resistor R21 may be connected between node N22 and the gate electrode of the NMOS transistor NT22. The capacitor C21 may be connected between the gate electrode of the NMOS transistor NT22 and the first power supply voltage AVDD. In some example embodiments, when the circuit 312a operates based on the glitch voltage VGLITCH, the glitch voltage VGLITCH (or other voltage corresponding to the first power supply voltage AVDD) rather than the first power supply voltage AVDD may be applied to the capacitor C21.

Currents I11, I12 and I13 may flow through the PMOS transistors PT21, PT22 and PT23, respectively, and currents I14 and I15 may flow through the NMOS transistors NT21 and NT22, respectively. A level of the first sensing voltage VPOS_SEN may be changed depending on a change in at least some of the currents I11, I12, I13, I14 and I15, which will be described with reference to FIG. 5.

The inverter 314 may generate a voltage corresponding to the first pulse voltage VPOS_PULSE by inverting the first sensing voltage VPOS_SEN.

The delay circuit 316 may generate the first pulse voltage VPOS_PULSE by delaying an output of the inverter 314. For example, although not illustrated in FIG. 4A, the delay circuit 316 may include a plurality of inverters (e.g., even number of inverters) connected in series.

Referring to FIG. 4B, a first glitch-to-pulse generating circuit 310b may include a circuit 312b and an inverter 314. The first glitch-to-pulse generating circuit 310b may further include a delay circuit 316.

The first glitch-to-pulse generating circuit 310b and its operation may be substantially the same as the first glitch-to-pulse generating circuit 310a of FIG. 4A, except that a configuration of the circuit 312b is changed.

The circuit 312b may include PMOS transistors PT21, PT22 and PT23, NMOS transistors NT21 and NT22, resistors R21 and R22 and a capacitor C21. The current source 313 in FIG. 4A may be replaced with the resistor R22, and thus the circuit 312b may have a relatively simple structure.

Figure 5:
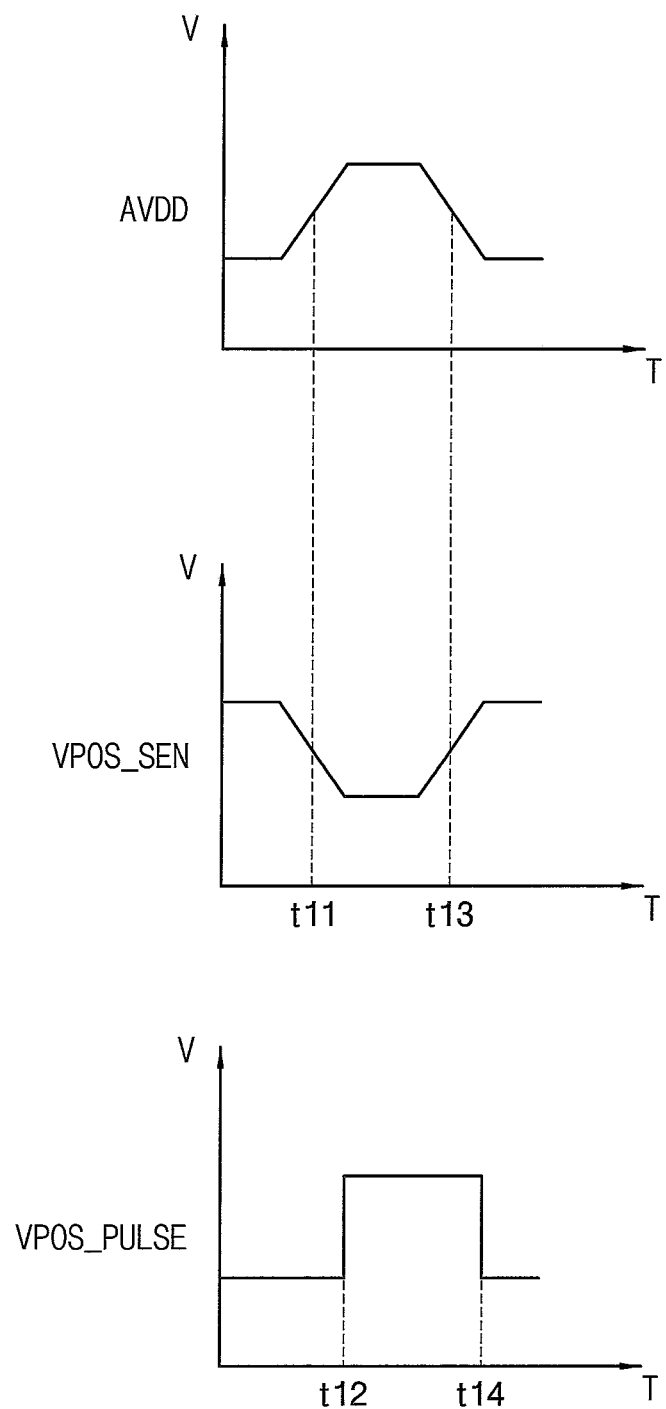
FIG. 5 is a timing diagram for describing an operation of a first glitch-to-pulse generating circuit of FIG. 4A.

FIG. 5 is a timing diagram for describing an operation of a first glitch-to-pulse generating circuit of FIG. 4A.

Referring to FIGS. 3, 4A and 5, during the normal operation during which the glitch does not occur, the amount of the current I11 flowing through the PMOS transistor PT21 may be substantially equal to the amount of the first reference current IR1. The amount of the current I12 flowing through the PMOS transistor PT22 and the amount of the current I14 flowing through the NMOS transistor NT21 may be substantially equal to each other, and each of the amount of the current I12 and the amount of the current I14 may be substantially equal to the amount of the current I11.

During normal operation during which the glitch does not occur, the level of the first sensing voltage VPOS_SEN may be substantially equal to a level of the second power supply voltage DVDD, and a level of the first pulse voltage VPOS_PULSE may be substantially equal to a level of the ground voltage.

When the up-glitch occurs on the first power supply voltage AVDD, the waveform of the first power supply voltage AVDD may change as shown in FIG. 5. Note that the waveform of the glitch voltage VGLITCH may change in substantially the same manner as shown in FIG. 3.

As illustrated in FIG. 5, when the waveform of the first power supply voltage AVDD changes, the up-glitch voltage may be instantaneously applied to the gate electrode of the NMOS transistor NT22 by the capacitor C21, and a voltage at the gate electrode of the NMOS transistor NT22 may instantaneously increase in a positive direction (+). When the first power supply voltage AVDD experiences an up-glitch, the increased voltage level of the first power supply voltage AVDD (resulting from the up-glitch) may be added (through capacitor C21) to the voltage being applied to the gate of NT22 to result in a voltage of sufficient magnitude to fully turn on transistor NT22. Thus, a gate-source voltage VGS of the NMOS transistor NT22 may increase to fully turn on transistor NT22 to connect node N23 to ground through transistor NT22, resulting in pulling the voltage VPOS_SEN at node N23 to ground. As a result of the level of the first sensing voltage VPOS_SEN may decrease to the ground voltage, the level of the first pulse voltage VPOS_PULSE increases to the level of the second power supply voltage DVDD, and thus the pulse may be formed within the first pulse voltage VPOS_PULSE. It will be appreciated that in this example that the pulse portion of VPOS_PULSE at the second power supply voltage DVDD corresponds to an activation of VPOS_PULSE.

As shown in FIG. 5, the transition time points of the first sensing voltage VPOS_SEN may be time t11 and time t13, and may be substantially the same as those of the voltage AVDD. The transition time points of the first pulse voltage VPOS_PULSE may be time t12 and time t14 that are delayed, by the delay circuit 316, from time t11 and time t13 by the predetermined delay time. Transition time points may refer to a point in which the logic level of a voltage changes from one logic level to another (e.g., from a voltage representing a low logic level or "0" to a voltage representing a high logic level or "1", or vice versa).

Figure 6:
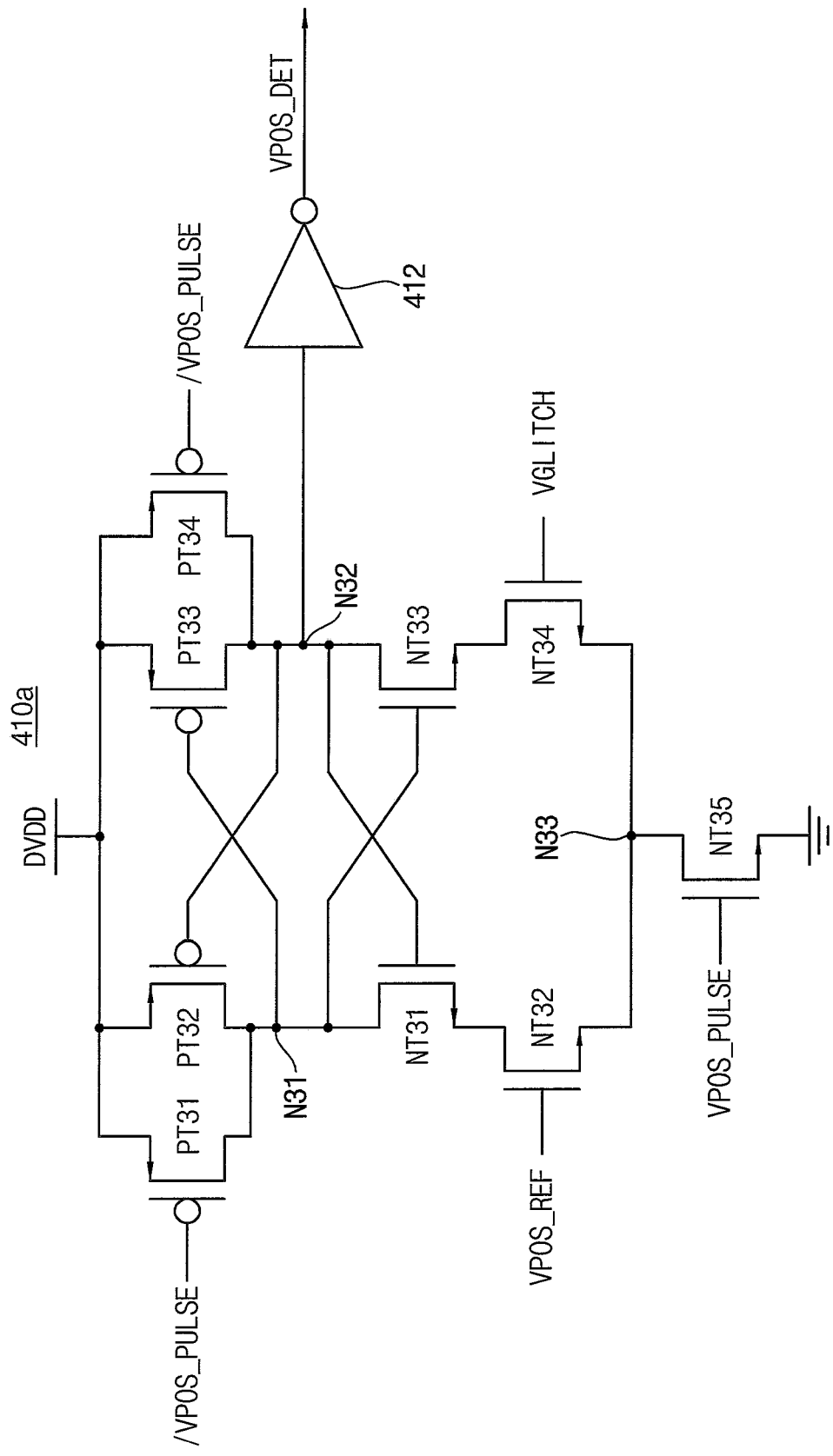
FIG. 6 is a diagram illustrating an example of a first latch-type comparator included in a glitch detector of FIG. 2.

FIG. 6 is a diagram illustrating an example of a first latch-type comparator included in a glitch detector of FIG. 2.

Referring to FIG. 6, a first latch-type comparator 410a may include PMOS transistors PT31, PT32, PT33 and PT34, NMOS transistors NT31, NT32, NT33, NT34 and NT35, and an inverter 412.

The PMOS transistors PT31 and PT32 may be connected in parallel between the second power supply voltage DVDD and node N31. The PMOS transistor PT31 may have a gate electrode receiving an inverted first pulse voltage/VPOS_PULSE generated by inverting the first pulse voltage VPOS_PULSE. The PMOS transistor PT32 may have a gate electrode connected to node N32. The PMOS transistors PT33 and PT34 may be connected in parallel between the second power supply voltage DVDD and node N32. The PMOS transistor PT33 PT32 may have a gate electrode connected to node N31. The PMOS transistor PT34 may have a gate electrode receiving the inverted first pulse voltage/VPOS_PULSE. As is understood, an inverted signal, such as the inverted first pulse voltage/VPOS_PULSE provides the inverted logical values of the signal that it inverts. The inverted signal may be provided at an output of an inverter (not shown) receiving the original non-inverted signal.

The NMOS transistors NT31 and NT32 may be connected in series between node N31 and node N33. The NMOS transistor NT31 may have a gate electrode connected to node N32. The NMOS transistor NT32 may have a gate electrode receiving the first reference voltage VPOS_REF. The NMOS transistors NT33 and NT34 may be connected in series between node N32 and node N33. The NMOS transistor NT33 may have a gate electrode connected to node N31. The NMOS transistor NT34 may have a gate electrode receiving the glitch voltage VGLITCH. The NMOS transistor NT35 may be connected between the node N33 and the ground voltage, and may have a gate electrode receiving the first pulse voltage VPOS_PULSE.

The inverter 412 may generate the first detection voltage VPOS_DET by inverting a voltage at the node N32.

The configuration of the first latch-type comparator 410a illustrated in FIG. 6 is only exemplary, and may be changed according to example embodiments.

Figure 7:
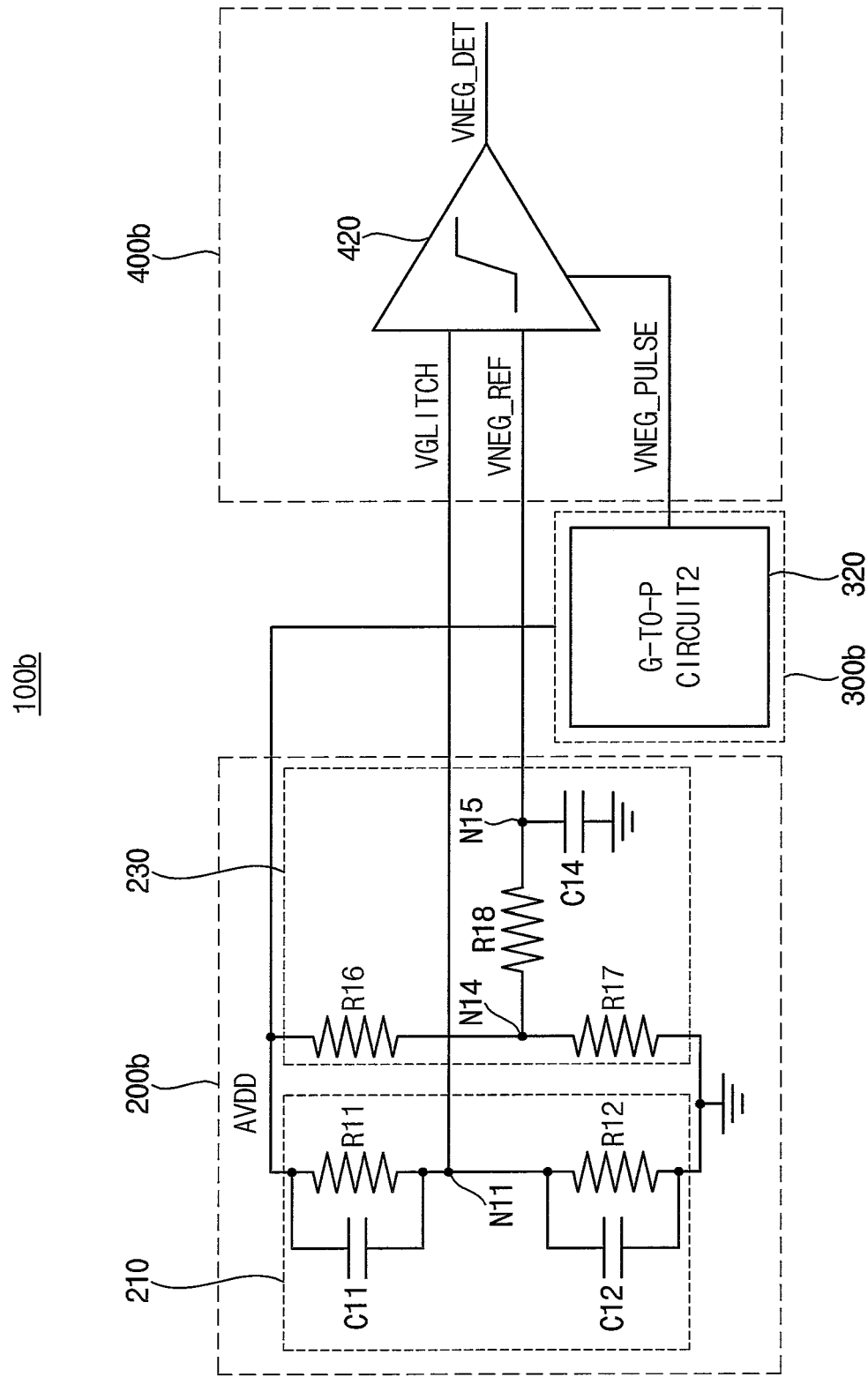
FIG. 7 is a diagram illustrating an example of a glitch detector according to example embodiments.

FIG. 7 is a diagram illustrating an example of a glitch detector according to example embodiments. Repetitive descriptions with respect to FIG. 2 may be omitted.

Referring to FIG. 7, a glitch detector 100b includes a sensing circuit 200b, a glitch-to-pulse generator 300b and a comparing circuit 400b.

The sensing circuit 200b may include a first circuit 210 and a third circuit 230. The first circuit 210 may generate the glitch voltage VGLITCH based on the first power supply voltage AVDD, and may form a sensor. The third circuit 230 may generate a second reference voltage VNEG_REF based on the first power supply voltage AVDD, and may form the reference voltage generating circuit. The second reference voltage VNEG_REF may be used to detect the down-glitch. For example, the second reference voltage VNEG_REF may have a level lower than that of the first reference voltage VPOS_REF.

The first circuit 210 may include resistors R11 and R12 and capacitors C11 and C12. A configuration of the first circuit 210 may be substantially the same as that of the first circuit 210 in FIG. 2, and connections between the resistors R11 and R12 and the capacitors C11 and C12 may be the same as those described with reference to FIG. 2.

The third circuit 230 may include resistors R16, R17 and R18 and a capacitor C14. The resistors R16 and R17 may be connected in series between the first power supply voltage AVDD and the ground voltage. The resistor R16 may be connected between the first power supply voltage AVDD and node N14. The resistor R17 may be connected between node N14 and the ground voltage. The resistor R18 may be connected between node N14 and node N15 outputting the second reference voltage VNEG_REF. The capacitor C14 may be connected between node N15 and the ground voltage. The level of the second reference voltage VNEG_REF may be determined depending on resistances of the resistors R16 and R17.

The glitch-to-pulse generator 300b may include a second glitch-to-pulse generating circuit (G-TO-P CIRCUIT2) 320. The second glitch-to-pulse generating circuit 320 may generate a second pulse voltage VNEG_PULSE in response to sensing the down-glitch. The down-glitch may be sensed and the pulse portion of VNEG_PULSE may be generated in response to the first power supply AVDD decreasing by a particular magnitude at at least a particular rate. The second glitch-to-pulse generating circuit 320 may be referred to as a negative glitch-to-pulse generating circuit. A detailed configuration of the second glitch-to-pulse generating circuit 320 will be described with reference to FIG. 9.

The comparing circuit 400b may include a second latch-type comparator 420. The second latch-type comparator 420 may generate a second detection voltage VNEG_DET by comparing the glitch voltage VGLITCH with the second reference voltage VNEG_REF only when the second pulse voltage VNEG_PULSE is activated. The second latch-type comparator 420 may be enabled by the activation of the second pulse voltage VNEG_PULSE (corresponding to the pulse portion of VNEG_PULSE in this example).

In some example embodiments, as with the glitch detector 100a of FIG. 2, the glitch detector 100b may not receive a clock signal that periodically toggles or swings between a first voltage level and a second voltage level, and thus the amount of static current consumption by the glitch detector 100b may be less than the predetermined amount of current.

Figure 8:
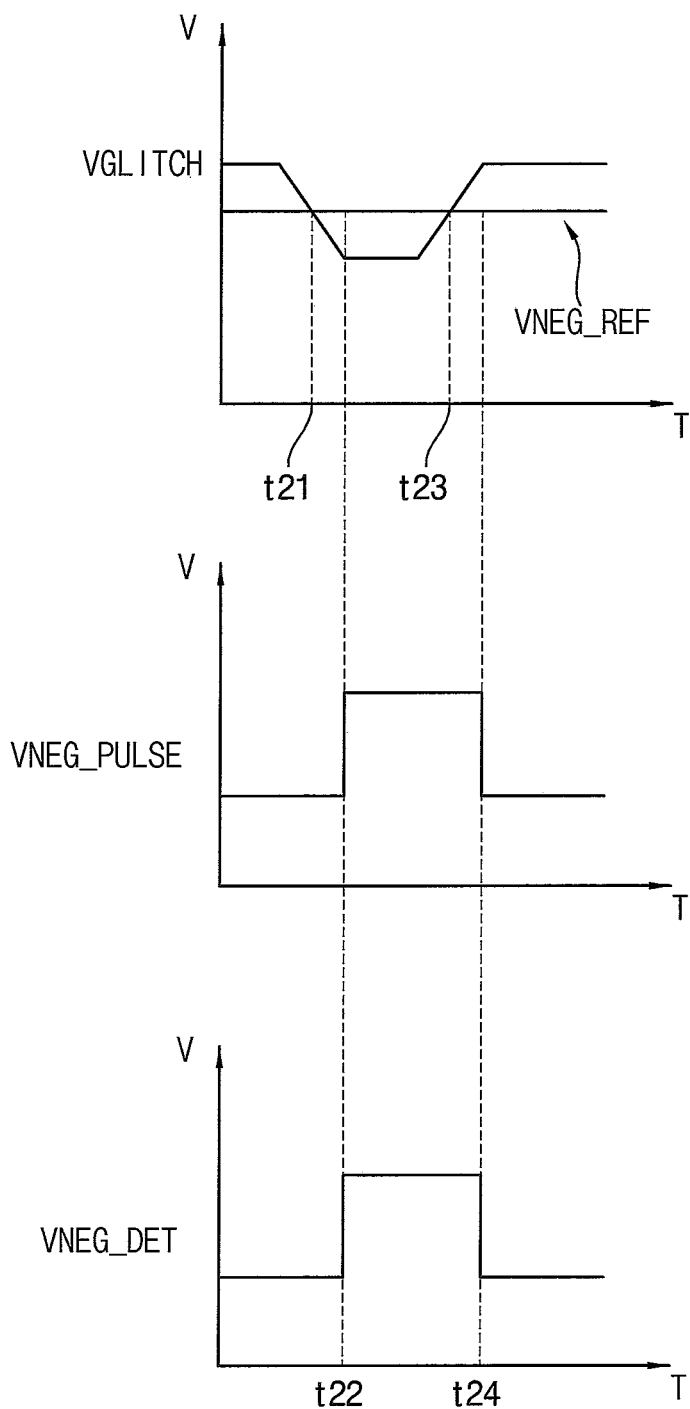
FIG. 8 is a timing diagram for describing an operation of a glitch detector of FIG. 7.

FIG. 8 is a timing diagram for describing an operation of a glitch detector of FIG. 7. Repetitive descriptions with respect to FIG. 3 may be omitted.

Referring to FIGS. 7 and 8, when a down-glitch occurs on the first power supply voltage AVDD, the level of the glitch voltage VGLITCH corresponding to the first power supply voltage AVDD may also decrease instantaneously and then increase. For example, the level of the glitch voltage VGLITCH may become lower than a level of the second reference voltage VNEG_REF at time t21 and may become higher than the level of the second reference voltage VNEG_REF at time t23.

The second pulse voltage VNEG_PULSE may include a pulse corresponding to the down-glitch. For example, the second pulse voltage VNEG_PULSE may transition from a low level to a high level at time t22, may transition from the high level to the low level at time t24, and thus may have the pulse of the high level between time t22 and time t24. For example, time t22 may be a time point that is elapsed by a predetermined delay time from time t21, and time t24 may be a time point that is elapsed by the predetermined delay time from time t23. For example, as will be described with reference to FIG. 9, the second glitch-to-pulse generating circuit 320 may include a delay circuit for the predetermined delay time.

The second detection voltage VNEG_DET may have a waveform substantially the same as that of the second pulse voltage VNEG_PULSE. For example, the second detection voltage VNEG_DET may transition from a low level to a high level at time t22, may transition from the high level to the low level at time t24, and thus may maintain the high level between time t22 and time t24. The second detection voltage VNEG_DET at the high level may indicate the occurrence of the down-glitch in the first power supply voltage AVDD.

Figure 9:
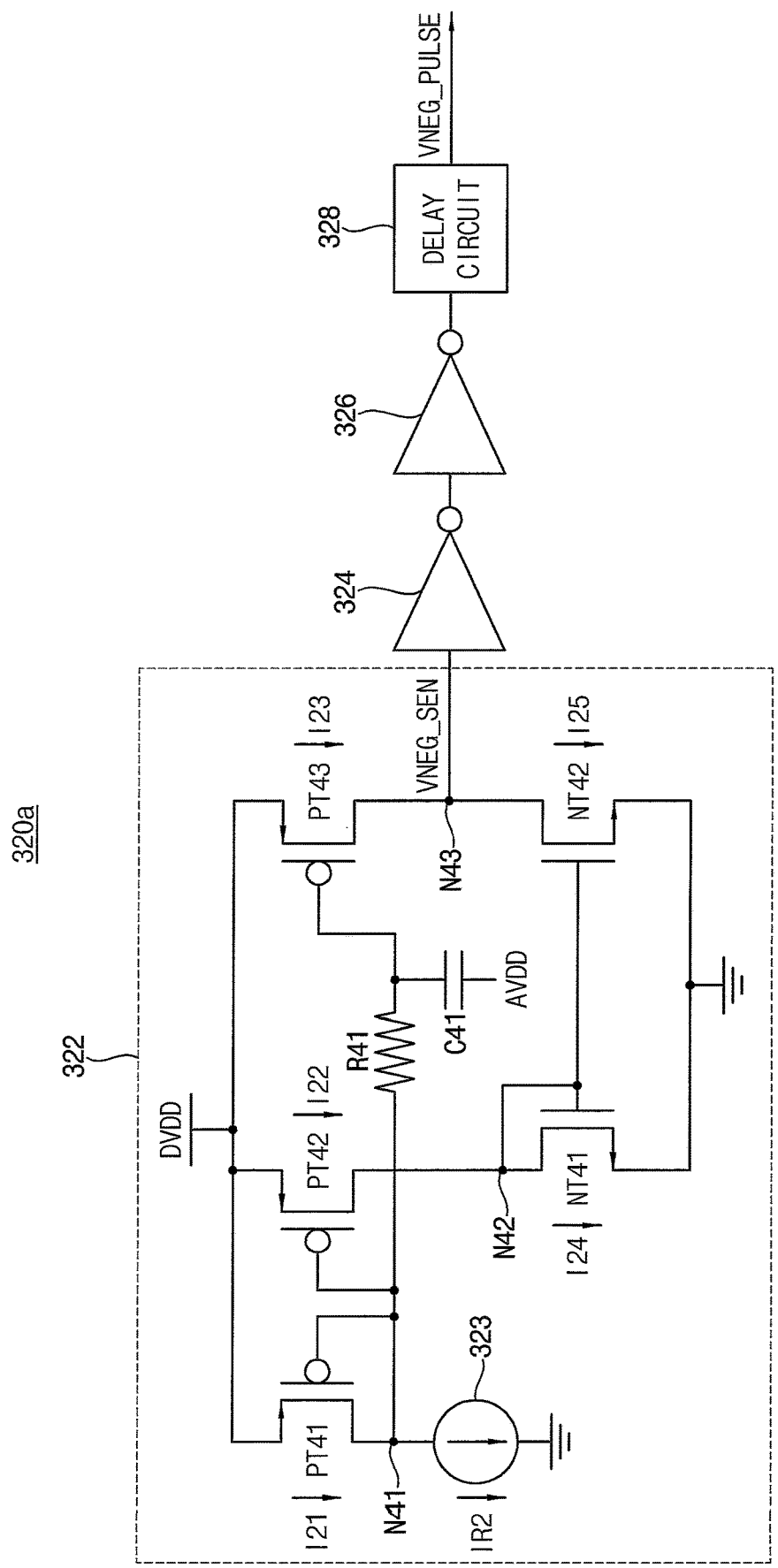
FIG. 9 is a diagram illustrating an example of a second glitch-to-pulse generating circuit included in a glitch detector of FIG. 7.

FIG. 9 is a diagram illustrating an example of a second glitch-to-pulse generating circuit included in a glitch detector of FIG. 7. Repetitive descriptions with respect to FIGS. 4A and 4B may be omitted.

Referring to FIG. 9, a second glitch-to-pulse generating circuit 320a may include a circuit 322, a first inverter 324 and a second inverter 326. The second glitch-to-pulse generating circuit 320a may further include a delay circuit 328.

The circuit 322 may generate a second sensing voltage VNEG_SEN based on a second reference current IR2, a second power supply voltage DVDD and the first power supply voltage AVDD. Although FIGS. 1, 7 and 9 illustrate an embodiment where circuit 322 receives the first power supply voltage AVDD to generate the second sensing voltage VNEG_SEN, other voltages corresponding to the first power supply voltage AVDD may instead be input to the circuit 322 in place of first power supply voltage AVDD, such as the glitch voltage VGLITCH or other voltage having a waveform derived from and corresponding to the waveform of the first power supply voltage AVDD (and it will be understood that the remaining description of this embodiment equally applies to such a modification). The second sensing voltage VNEG_SEN may be activated when the down-glitch occurs on the first power supply voltage AVDD. FIG. 9 illustrates an example where the circuit 322 operates based on the first power supply voltage AVDD.

The circuit 322 may include PMOS transistors PT41, PT42 and PT43, a current source 323, NMOS transistors NT41 and NT42, a resistor R41 and a capacitor C41.

The PMOS transistor PT41 may be connected between the second power supply voltage DVDD and node N41, and may have a gate electrode connected to node N41. The PMOS transistor PT42 may be connected between the second power supply voltage DVDD and node N42, and may have a gate electrode connected to node N41. The PMOS transistor PT43 may be connected between the second power supply voltage DVDD and node N43 outputting the second sensing voltage VNEG_SEN, and may have a gate electrode connected to the resistor R41 and the capacitor C41. The current source 323 may be connected between node N41 and the ground voltage, and may generate the second reference current IR2. The NMOS transistor NT41 may be connected between node N42 and the ground voltage, and may have a gate electrode connected to node N42. The NMOS transistor NT42 may be connected between node N43 and the ground voltage, and may have a gate electrode connected to node N42. The resistor R41 may be connected between node N41 and the gate electrode of the PMOS transistor PT43. The capacitor C41 may be connected between the gate electrode of the MOS transistor PT43 and the first power supply voltage AVDD. In some example embodiments, when the circuit 322 operates based on the glitch voltage VGLITCH, the glitch voltage VGLITCH (or other voltage corresponding to the first power supply voltage AVDD) rather than the first power supply voltage AVDD may be applied to the capacitor C41.

Currents I21, I22 and I23 may flow through the PMOS transistors PT41, PT42 and PT43, respectively, and currents I24 and I25 may flow through the NMOS transistors NT41 and NT42, respectively. A level of the second sensing voltage VNEG_SEN may be changed depending on a change in at least some of the currents I21, I22, I23, I24 and I25, which will be described with reference to FIG. 10.

The first and second inverters 324 and 326 may be connected in series to each other, and may generate a voltage corresponding to the second pulse voltage VNEG_PULSE based on the second sensing voltage VNEG_SEN.

The delay circuit 328 may generate the second pulse voltage VNEG_PULSE by delaying an output of the second inverter 326.

Although not illustrated in FIG. 9, the current source 323 may be replaced with a resistor, as described with reference to FIG. 4B.

Figure 10:
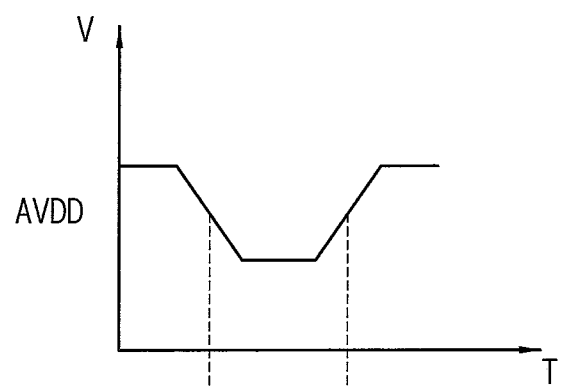
FIG. 10 is a timing diagram for describing an operation of a second glitch-to-pulse generating circuit of FIG. 9.
Figure 10:
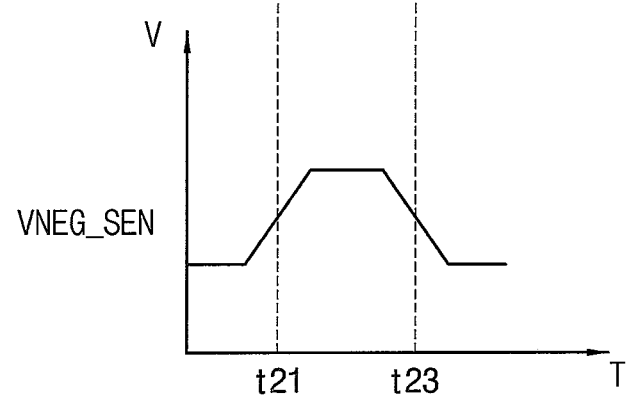
Figure 10:
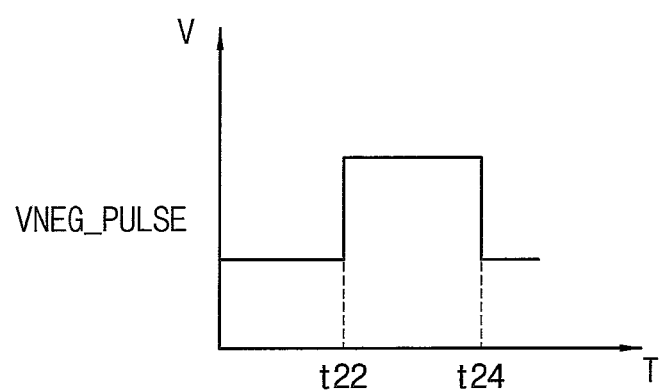

FIG. 10 is a timing diagram for describing an operation of a second glitch-to-pulse generating circuit of FIG. 9. Repetitive descriptions with respect to FIG. 5 may be omitted.

Referring to FIGS. 8, 9 and 10, during the normal operation in which the glitch does not occur, the amount of the current I21 flowing through the PMOS transistor PT41 may be substantially equal to the amount of the second reference current IR2. The amount of the current I22 flowing through the PMOS transistor PT42 and the amount of the current I24 flowing through the NMOS transistor NT41 may be substantially equal to each other, and each of the amount of the current I22 and the amount of the current I24 may be substantially equal to the amount of the current I21.

During normal operation during which the glitch voltage does not occur, the level of the second sensing voltage VNEG_SEN may be substantially equal to the level of the ground voltage, and the level of the second pulse voltage VNEG_PULSE may also be substantially equal to the level of the ground voltage.

The operation of the second glitch-to-pulse generating circuit 320a illustrated in FIGS. 9 and 10 may be similar to the operation of the first glitch-to-pulse generating circuit 310a illustrated in FIGS. 3 and 4.

For example, when the down-glitch occurs on the first power supply voltage AVDD, the waveform of the first power supply voltage AVDD may change as shown in FIG. 10. Note that the waveform of the glitch voltage VGLITCH may also change substantially the same as the waveform of the first power supply voltage AVDD as shown in FIG. 8.

As illustrated in FIG. 10, when the waveform of the first power supply voltage AVDD changes, the down-glitch may be instantaneously applied to the gate electrode of the PMOS transistor PT43 by the capacitor C41, and a voltage at the gate electrode of the PMOS transistor PT43 may instantaneously decrease in a negative direction (−). When the first power supply voltage AVDD experiences the down-glitch, the voltage level drop of the first power supply voltage AVDD may be subtracted (through capacitor C41) to the voltage being applied to the gate of the PMOS transistor PT43 to result in a voltage sufficient in magnitude to fully turn on PMOS transistor PT43. Thus, the PMOS transistor PT43 may connect node N43 to DVDD to pull up the voltage of node N43 to the level of the second power supply voltage DVDD. As a result of the level of the second sensing voltage VNEG_SEN increasing to the level of the second power supply voltage DVDD, the level of the second pulse voltage VNEG_PULSE may increase to the level of the second power supply voltage DVDD, and thus the pulse may be formed within the second pulse voltage VNEG_PULSE. It will be appreciated that in this example that the pulse portion of VNEG_PULSE at the level of the second power supply voltage DVDD corresponds to an activation of VNEG_PULSE.

The transition time points of the second sensing voltage VNEG_SEN may be time t21 and time t23, and may be substantially the same as those of the first power supply voltage AVDD. The transition time points of the second pulse voltage VNEG_PULSE may be time t22 and time t24 that are delayed, by the delay circuit 328, from time t21 and time t23 by the predetermined delay time.

The configuration of the second latch-type comparator 420 included in the glitch detector 100b of FIG. 7 may be the same as that described with reference to FIG. 6. Inputs to PMOS transistors PT31 and PT34 (at their gates) may be provided as/VNEG_PULSE (the inversion of the second pulse voltage VNEG_PULSE). To provide an activation signal of VNEG_DET as the level of the voltage of the second power supply DVDD, VGLITCH may be connected to the gate of NMOS transistor NT32 and the second pulse voltage VNEG_PULSE may be connected to the gate of NMOS transistor NT34. Alternatively, VGLITCH may be connected to the gate of NMOS transistor NT34 (as in FIG. 6) and the second pulse voltage VNEG_PULSE may be connected to the gate of NMOS transistor NT32 and zero or an even number of inverters may be provided between node N32 and the output signal of VNEG_DET. However, example embodiments are not limited thereto, and the configuration of the second latch-type comparator 420 may be changed according to example embodiments.

Figure 11:
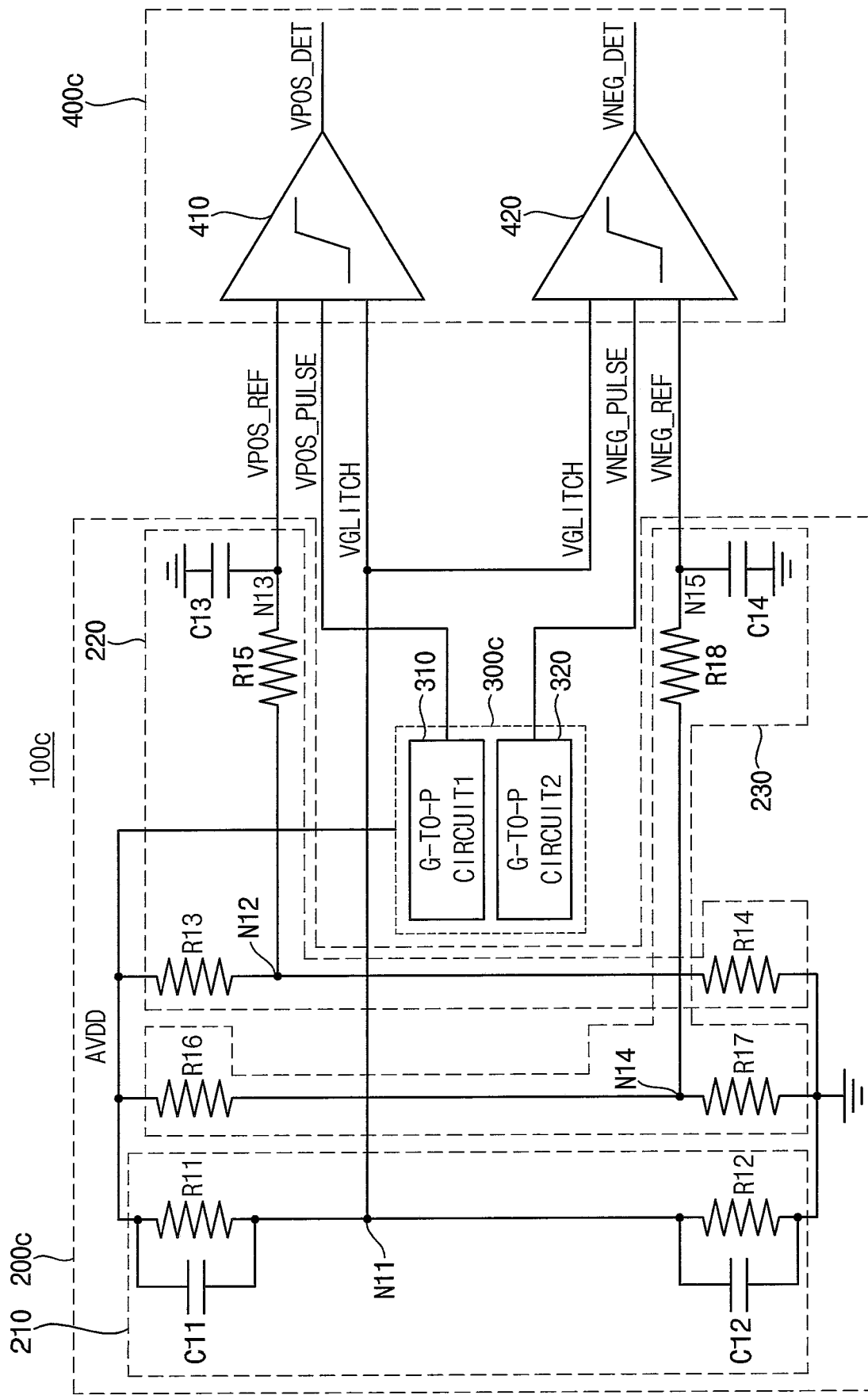
FIG. 11 is a diagram illustrating an example of a glitch detector according to example embodiments.

FIG. 11 is a diagram illustrating an example of a glitch detector according to example embodiments. Repetitive descriptions with respect to FIGS. 2 and 7 may be omitted.

Referring to FIG. 11, a glitch detector 100c includes a sensing circuit 200c, a glitch-to-pulse generator 300c and a comparing circuit 400c. The glitch detector 100c may have a configuration of the combination of the glitch detector 100a of FIG. 2 and the glitch detector 100b of FIG. 7.

The sensing circuit 200c may include a first circuit 210, a second circuit 220 and a third circuit 230. The first circuit 210 may generate the glitch voltage VGLITCH based on the first power supply voltage AVDD, and may form a sensor. The second circuit 220 may generate a first reference voltage VPOS_REF based on the first power supply voltage AVDD, the third circuit 230 may generate a second reference voltage VNEG_REF based on the first power supply voltage AVDD, and the second and third circuits 220 and 230 may form a reference voltage generating circuit.

The first circuit 210 may include resistors R11 and R12 and capacitors C11 and C12, and may be the same as the first circuit 210 in FIGS. 2 and 7. The second circuit 220 may include resistors R13, R14 and R15 and a capacitor C13, and may be the same as the second circuit 220 in FIG. 2. The third circuit 230 may include resistors R16, R17 and R18 and a capacitor C14, and may be the same as the third circuit 230 in FIG. 7. Connections between the resistors R11, R12, R13, R14, R15, R16, R17 and R18 and the capacitors C11, C12, C13 and C14 may be the same as those described with reference to FIGS. 2 and 7.

The glitch-to-pulse generator 300c may include the first glitch-to-pulse generating circuit 310 and the second glitch-to-pulse generating circuit 320. The first glitch-to-pulse generating circuit 310 may generate a first pulse voltage VPOS_PULSE in response to sensing the up-glitch higher than the first reference voltage VPOS_REF. The second glitch-to-pulse generating circuit 320 may generate a second pulse voltage VNEG_PULSE in response to sensing the down-glitch lower than the second reference voltage VNEG_REF. The first glitch-to-pulse generating circuit 310 may be the same as the first glitch-to-pulse generating circuit 310 in FIG. 2. The second glitch-to-pulse generating circuit 320 may be the same as the second glitch-to-pulse generating circuit 320 in FIG. 7.

The comparing circuit 400c may include a first latch-type comparator 410 and a second latch-type comparator 420. The first latch-type comparator 410 may generate a first detection voltage VPOS_DET by comparing the glitch voltage VGLITCH with the first reference voltage VPOS_REF only when the first pulse voltage VPOS_PULSE is activated. The second latch-type comparator 420 may generate a second detection voltage VNEG_DET by comparing the glitch voltage VGLITCH with the second reference voltage VNEG_REF only when the second pulse voltage VNEG_PULSE is activated. The first latch-type comparator 410 may be the same as the first latch-type comparator 410 in FIG. 2. The second latch-type comparator 420 may be the same as the second latch-type comparator 420 in FIG. 7.

Figure 12:
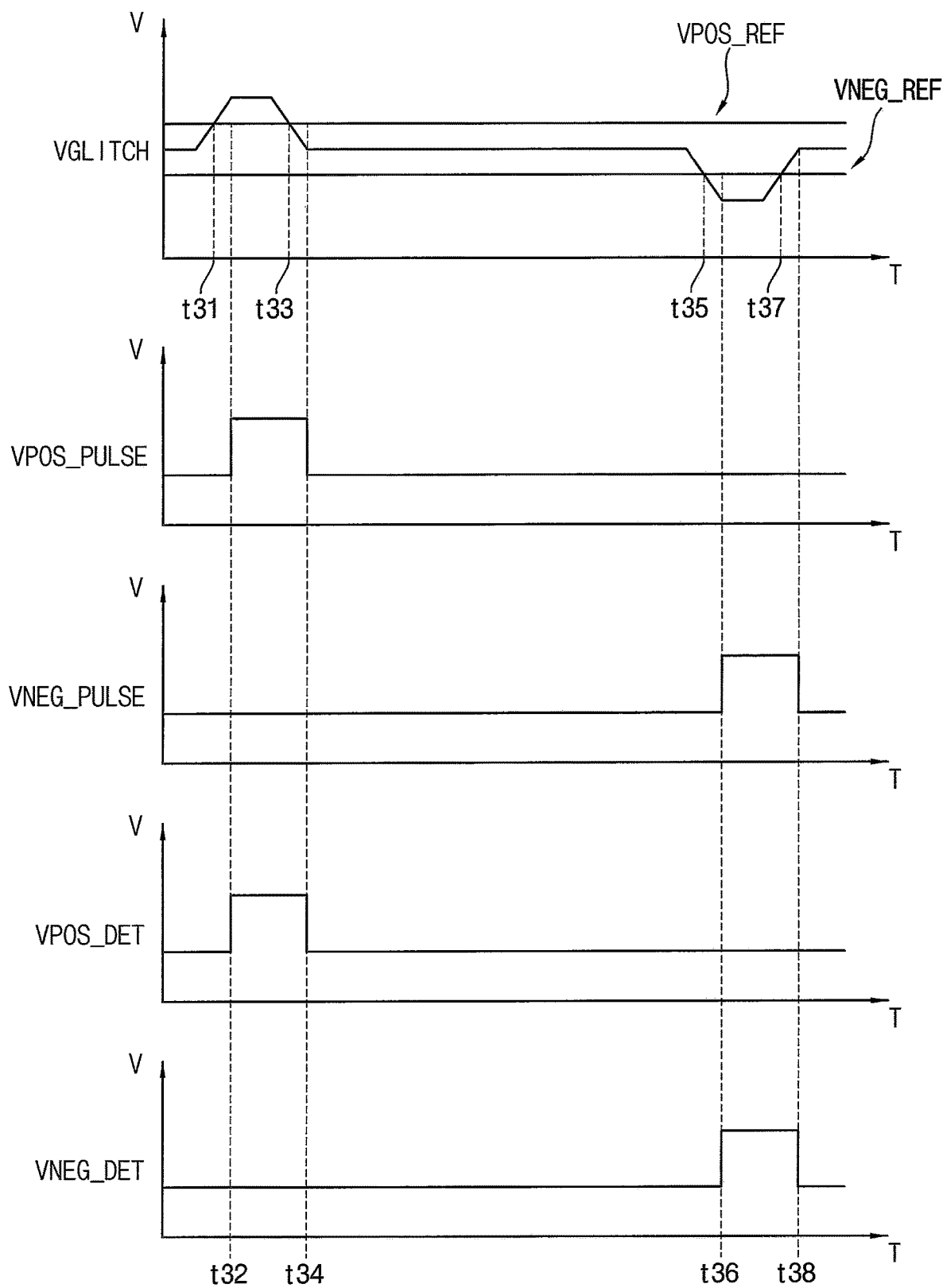
FIG. 12 is a timing diagram for describing an operation of a glitch detector of FIG. 11.

FIG. 12 is a timing diagram for describing an operation of a glitch detector of FIG. 11. Repetitive descriptions with respect to FIGS. 3 and 8 may be omitted.

Referring to FIGS. 11 and 12, when an up-glitch occurs on the first power supply voltage AVDD, changes in the glitch voltage VGLITCH, the first pulse voltage VPOS_PULSE and the first detection voltage VPOS_DET may be the same as those described with reference to FIGS. 2 and 3, and times t31, t32, t33 and t34 may be the same as times t11, t12, t13 and t14 in FIG. 3, respectively. When a down-glitch occurs on the first power supply voltage AVDD, changes in the glitch voltage VGLITCH, the second pulse voltage VNEG_PULSE and the second detection voltage VNEG_DET may be the same as those described with reference to FIGS. 7 and 8, and times t35, t36, t37 and t38 may be the same as times t21, t22, t23 and t24 in FIG. 8, respectively. When at least one of the first detection voltage VPOS_DET and the second detection voltage VNEG_DET has a high level, it may be determined that at least one of the up-glitch and the down-glitch has occurred. The first detection voltage VPOS_DET at a high level may indicate the occurrence of an up-glitch on the first power supply voltage AVDD and the second detection voltage VNEG_DET at a high level may indicate the occurrence of a down-glitch on the first power supply voltage AVDD.

Figure 13:
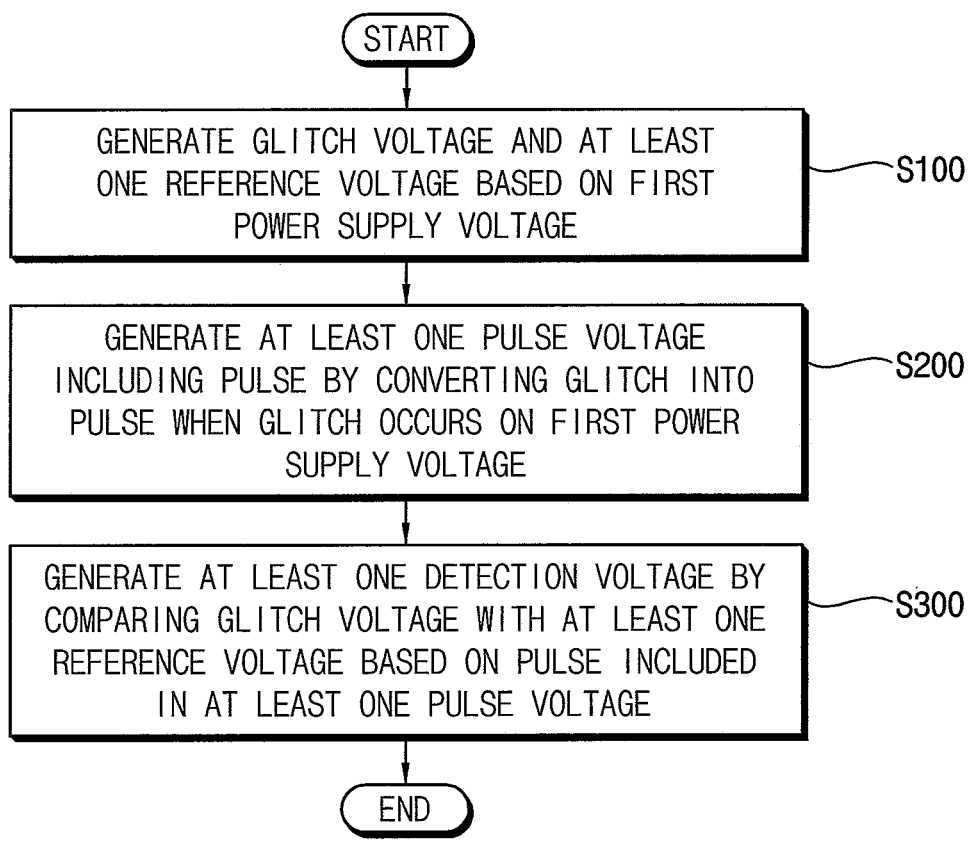
FIG. 13 is a flowchart illustrating a method of detecting a glitch according to example embodiments.

FIG. 13 is a flowchart illustrating a method of detecting a glitch according to example embodiments.

Referring to FIGS. 1 and 13, in a method of detecting a glitch according to example embodiments, the glitch voltage VGLITCH and the at least one reference voltage VREF are generated based on the first power supply voltage AVDD (step S100). For example, the at least one reference voltage VREF may include at least one of the first reference voltage VPOS_REF for detecting the up-glitch and the second reference voltage VNEG_REF for detecting the down-glitch.

The first power supply voltage AVDD or the glitch voltage VGLITCH is received, and a pulse portion of at least one pulse voltage VPULSE is generated in response to the glitch occurring on the first power supply voltage AVDD (step S200). For example, the pulse of the at least one pulse voltage VPULSE may include at least one of the pulse of the first pulse voltage VPOS_PULSE corresponding to the up-glitch and the pulse of the second pulse voltage VNEG_PULSE corresponding to the down-glitch.

The at least one detection voltage VDET is generated by comparing the glitch voltage VGLITCH with the at least one reference voltage VREF based on the pulse included in the at least one pulse voltage VPULSE (step S300). The at least one detection voltage VDET is activated when the glitch occurs on the first power supply voltage AVDD. For example, the at least one detection voltage VDET may include at least one of the first detection voltage VPOS_DET representing the detection of the up-glitch and the second detection voltage VNEG_DET representing the detection of the down-glitch.

In some example embodiments, Step S100 may be performed by the sensing circuit 200, step S200 may be performed by the glitch-to-pulse generator 300, and step S300 may be performed by the comparing circuit 400. For example, step S200 may be performed using at least one of the configuration and operation described herein with reference to FIGS. 4A and 5 and the configuration and operation described herein with reference to FIGS. 9 and 10. For example, step S300 may be performed using at least one of the configuration and operation described herein with reference to FIGS. 3 and 6 and the configuration and operation described herein with reference to FIG. 8.

Figure 14:
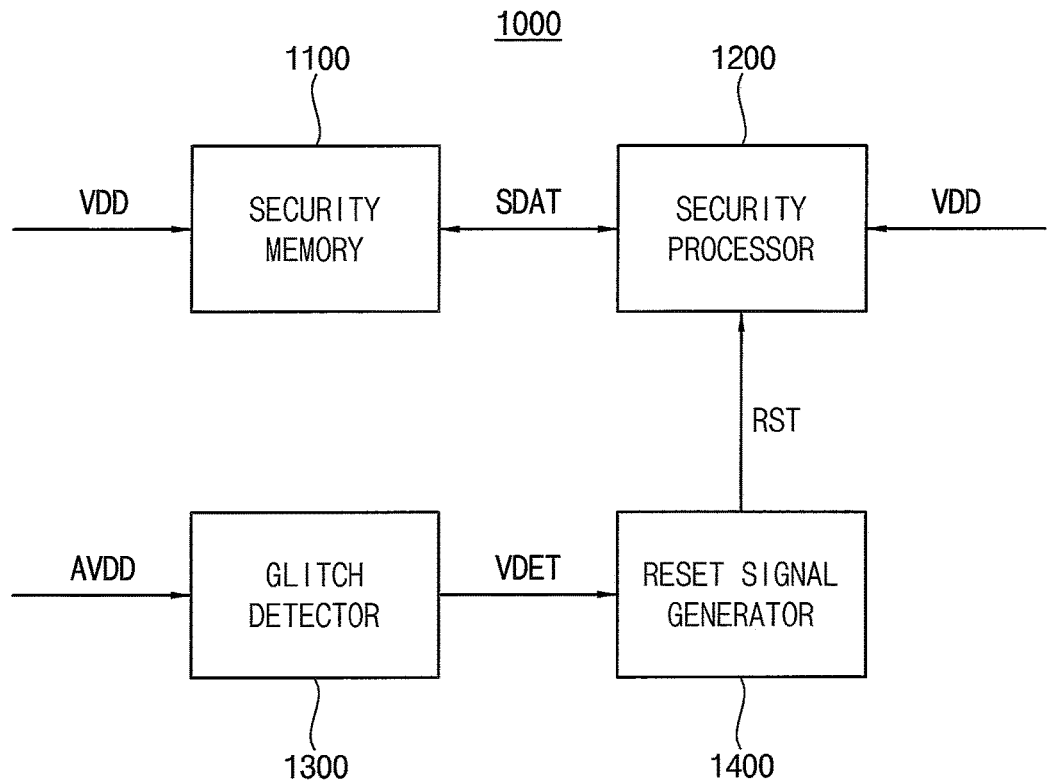
FIG. 14 is a block diagram illustrating a security device according to example embodiments.

FIG. 14 is a block diagram illustrating a security device according to example embodiments.

Referring to FIG. 14, a security (or secure) device 1000 includes security memory 1100, a security processor 1200, a glitch detector 1300 and a reset signal generator 1400. For example, the security device 1000 may be a smart card, a secure element (SE), or the like. For example, the security device 1000 may be formed as a single semiconductor chip or several interconnected semiconductor chips within a semiconductor package.

The security memory 1100 stores security data SDAT, and the security processor 1200 processes the security data SDAT. For example, the security data SDAT may include a cryptographic key, sensitive data, a sensitive code, or the like. For example, the security memory 1100 and the security processor 1200 may operate based on a power supply voltage VDD. For example, the power supply voltage VDD may be generated based on a first power supply voltage AVDD. The power supply voltage VDD may be the second power supply voltage and may also be provided to other circuits of the security device 1000 (e.g., to security processor 1200, glitch detector 1300 and reset signal generator 1400).

In some example embodiments, the security memory 1100 may be a nonvolatile memory, e.g., an electrically erasable programmable read-only memory (EEPROM), a flash memory, a phase random access memory (PRAM), a resistive random access memory (RRAM), a nano floating gate memory (NFGM), a polymer random access memory (PoRAM), a magnetic random access memory (MRAM), a ferroelectric random access memory (FRAM), a thyristor random access memory (TRAM), or the like, and/or a volatile memory, e.g., a dynamic random access memory (DRAM), a static random access memory (SRAM), or the like, or may be a combination of any two or more of these memories.

In some example embodiments, the security processor 1200 may be any processing device, e.g., a central processing unit (CPU), a microprocessor, or the like.

In some example embodiments, the security device 1000 may have a temper-resistant function or may be resistant against tampering attacks, such as micro-probing, a software attack, eavesdropping, a fault generation attack, or the like. The security device 1000 may be referred to as security hardware, a security component or a security module.

The micro-probing may involve directly accessing a chip surface (e.g., of a semiconductor chip forming all or part of the security device). The software attack may involve interfacing the processor and accessing a password algorithm or an algorithm execution in a protocol. The eavesdropping may involve measuring and detecting signal characteristics and electromagnetic radiations from the processor during its normal operation. The fault generation attack may use an abnormal circumstance condition to generate a processor error providing an additional access. The micro-probing technique may be an invasive attack, while other techniques may be non-invasive attacks.

The glitch attack may involve application of an externally applied signal or energy to the security device 1000 or the power source to access the security device 1000. For example, data may be extracted from the security memory 1100 by applying a glitch to the voltage supplied for operating an internal chip of the security device 1000.

The glitch detector 1300 generates at least one detection voltage VDET that is activated when a glitch occurs on the first power supply voltage AVDD. The glitch detector 1300 may be the glitch detector according to the example embodiments described herein, and may be implemented and operate as described with reference to FIGS. 1 through 13. In the glitch detector 1300, the pulse may be generated only at the moment when the glitch occurs, the comparison operation may be performed in response to the pulse, and thus the glitch may be rapidly detected or sensed only at the desired moment. Accordingly, the static current and power consumption may be reduced during a normal operation in which the glitch does not occur.

The reset signal generator 1400 generates a reset signal RST based on the at least one detection voltage VDET. For example, a waveform of the reset signal RST may be the same as that of at least one of the first detection voltage VPOS_DET and the second detection voltage VNEG_DET. The reset signal RST may be provided to the security processor 1200, and the security processor 1200 may be reset based on the reset signal RST. Accordingly, the leakage, destruction or alteration of the security data SDAT caused by an external attack may be prevented, the security device 1000 may securely and/or safely protect the security data SDAT, and the security device 1000 may have the improved or enhanced security performance.

Although FIG. 14 illustrates that the reset signal RST is provided only to the security processor 1200, example embodiments are not limited thereto. For example, the reset signal RST may also be provided to the security memory 1100, and the security memory 1100 may also be reset based on the reset signal RST.

Figure 15:
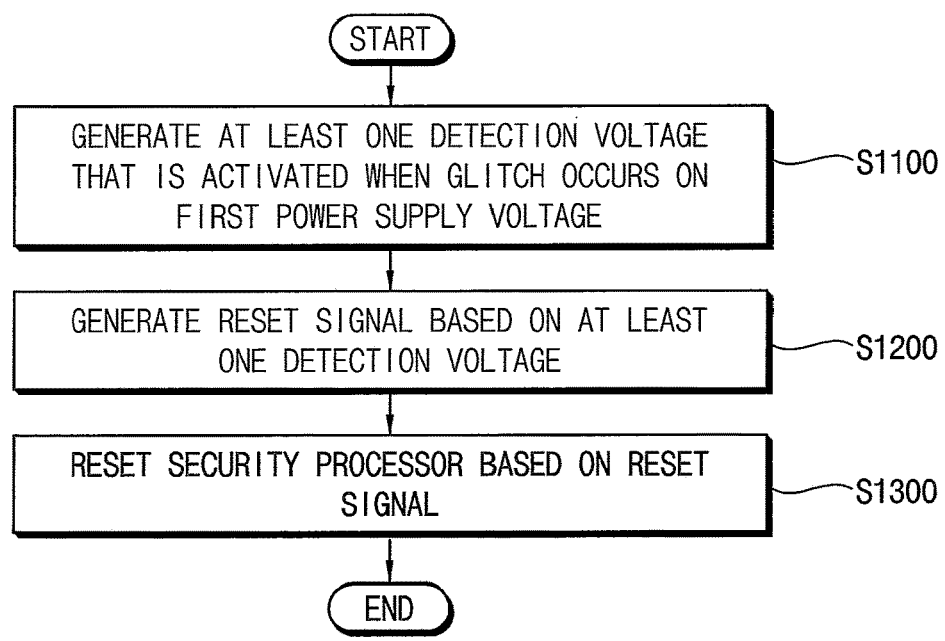
FIG. 15 is a flowchart illustrating a method of operating a security device according to example embodiments.

FIG. 15 is a flowchart illustrating a method of operating a security device according to example embodiments.

Referring to FIGS. 14 and 15, in a method of operating a security device according to example embodiments, the at least one detection voltage VDET that is activated when the glitch occurs on the first power supply voltage AVDD is generated (step S1100). Step S1100 may be performed based on the method of detecting the glitch according to any example embodiments described herein, such as with reference to FIG. 13.

The reset signal RST is generated based on the at least one detection voltage VDET (step S1200), and the security processor 1200 is reset based on the reset signal RST (step S1300). In some example embodiments, the security memory 1100 may also be reset based on the reset signal RST.

As will be appreciated by those skilled in the art, the inventive concept may be embodied as a device, system or method.

Figure 16:
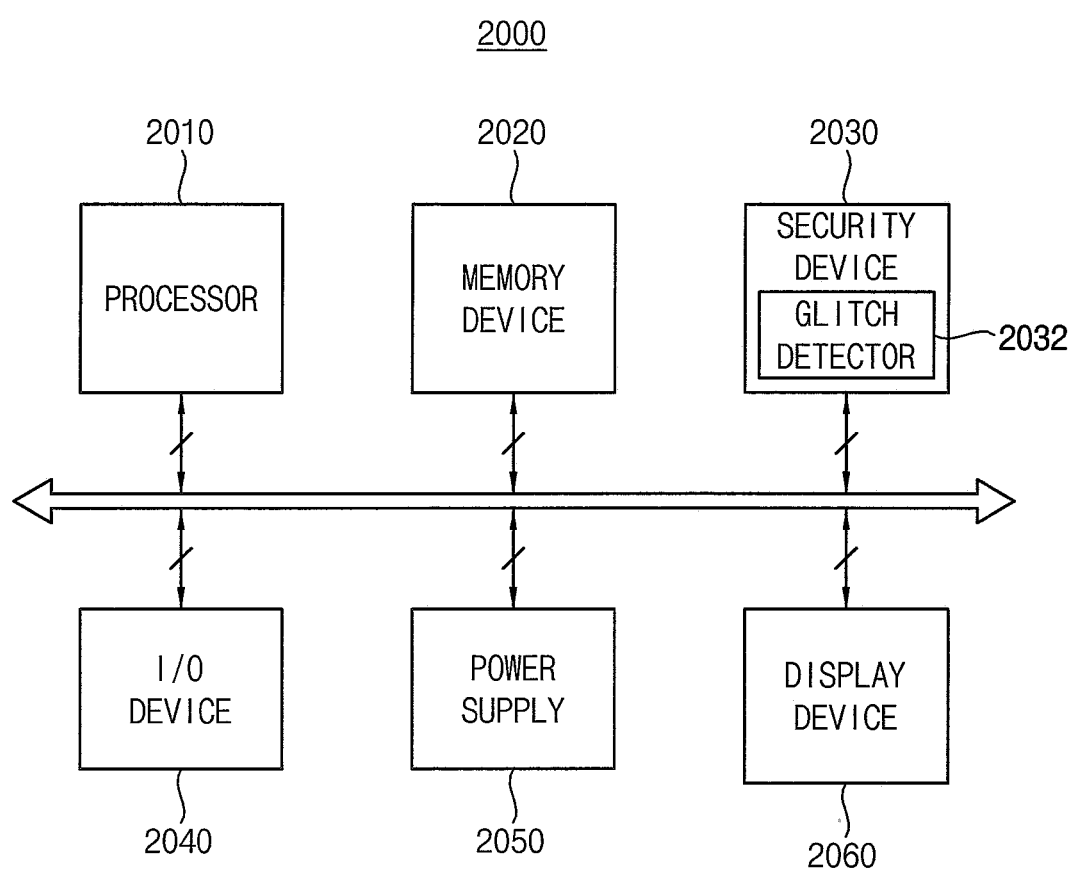
FIG. 16 is a block diagram illustrating an electronic system according to example embodiments.

FIG. 16 is a block diagram illustrating an electronic system according to example embodiments.

Referring to FIG. 16, an electronic system 2000 may include a processor 2010, a memory device 2020, a security device 2030, an input/output (I/O) device 2040, a power supply 2050 and a display device 2060. The electronic system 2000 may further include a plurality of ports for communicating a video card, a sound card, a memory card, a universal serial bus (USB) device, other electronic devices, etc.

The processor 2010 controls operations of the electronic system 2000. The processor 2010 may execute an operating system and at least one application to provide an internet browser, games, videos, or the like. The memory device 2020 may store data for the operations of the electronic system 2000. The I/O device 2040 may include an input device such as a keyboard, a keypad, a mouse, a touchpad, a touch-screen, a remote controller, etc., and an output device such as a printer, a speaker, a display, etc. The power supply 2050 may provide a power for the operations of the electronic system 2000. The display device 2060 may display an image.

The processor 2010 may control a normal operation, and the security device 2030 may control a security operation. The security device 2030 may be the security device according to example embodiments, and may be implemented as described with reference to FIGS. 14 and 15. The security device 2030 may include a glitch detector 2032. In the glitch detector 2032, the pulse may be generated only at the moment when the glitch occurs, the comparison operation may be performed in response to the pulse being generated, and thus the glitch may be rapidly detected or sensed only at the desired moment. Accordingly, the static current and power consumption may be reduced during a normal operation in which the glitch does not occur. In the security device 2030, the leakage, destruction or alteration of the security data caused by an external attack may be prevented. Accordingly, the security device 2030 may securely and/or safely protect the security data, and the security device 2030 may have the improved or enhanced security performance.

The electronic system 2000 may be a computer. In some example embodiments, the electronic system 2000 may be a security-related system, and the glitch detector 2032 may be used as a detector for preventing hacking. In other example embodiments, the electronic system 2000 may be a mobile system such as an application processor (AP), a wearable device, or the like, and the glitch detector 2032 may be used as a detector for preventing hacking that operates with relatively low power. In still other example embodiments, the electronic system 2000 may be part of an automotive system, and the glitch detector 2032 may be used as a safety-related detector.

The inventive concept may be applied to various electronic devices and systems that include the glitch detectors and the security devices. For example, the inventive concept may be applied to systems such as a personal computer (PC), a server computer, a data center, a workstation, a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, etc.

The foregoing is illustrative of example embodiments and is not to be construed as limiting. Although some example embodiments have been described, those skilled in the art will readily appreciate that many modifications are possible to the example embodiments without materially departing from the novel teachings and advantages of the example embodiments. Accordingly, all such modifications are intended to be included within the scope of the invention as defined in the claims. Therefore, it is to be understood that the foregoing is illustrative and should not t be construed as limiting to the present invention.

What is claimed is:

1. A glitch detector comprising:
   a sensing circuit configured to generate a glitch voltage and at least one reference voltage based on a first power supply voltage;
   a glitch-to-pulse generation circuit configured to receive at least one of the first power supply voltage and the glitch voltage, and to generate a pulse of a pulse voltage in response to an occurrence of the glitch on the first power supply voltage; and
   a comparing circuit configured to generate at least one detection voltage by comparing the glitch voltage with the at least one reference voltage in response to the pulse of the pulse voltage.

2. The glitch detector of claim 1, wherein the glitch-to-pulse generation circuit includes:
a first glitch-to-pulse generating circuit configured to generate a first pulse voltage in response to sensing an up-glitch higher than a first reference voltage.

3. The glitch detector of claim 2, wherein the first glitch-to-pulse generating circuit includes:
a first circuit configured to generate a first sensing voltage based on a first reference current, a second power supply voltage and one of the first power supply voltage and the glitch voltage, the first sensing voltage being activated in response to the occurrence of the up-glitch on the first power supply voltage; and
a first inverter configured to invert the first sensing voltage.

4. The glitch detector of claim 3, wherein the first circuit includes:
a first p-type metal oxide semiconductor (PMOS) transistor connected between the second power supply voltage and a first node, and having a gate electrode connected to the first node;
a second PMOS transistor connected between the second power supply voltage and a second node, and having a gate electrode connected to the first node;
a third PMOS transistor connected between the second power supply voltage and a third node outputting the first sensing voltage, and having a gate electrode connected to the first node;
a first current source connected between the first node and a ground voltage, and configured to generate the first reference current;
a first n-type metal oxide semiconductor (NMOS) transistor connected between the second node and the ground voltage, and having a gate electrode connected to the second node;
a second NMOS transistor connected between the third node and the ground voltage, and having a gate electrode;
a first resistor connected between the second node and the gate electrode of the second NMOS transistor; and
a first capacitor connected between the gate electrode of the second NMOS transistor and one of the first power supply voltage and the glitch voltage.

5. The glitch detector of claim 3, wherein the first glitch-to-pulse generating circuit further includes:
a first delay circuit configured to generate the first pulse voltage by delaying an output of the first inverter.

6. The glitch detector of claim 2, wherein the comparing circuit includes:
a first latch-type comparator configured to generate a first detection voltage by comparing the glitch voltage with the first reference voltage only when the pulse of the first pulse voltage is received by the first latch-type comparator.

7. The glitch detector of claim 6, wherein the first latch-type comparator includes:
first and second PMOS transistors connected in parallel between a second power supply voltage and a first node, the first PMOS transistor having a gate electrode receiving an inverted first pulse voltage generated by inverting the first pulse voltage, the second PMOS transistor having a gate electrode connected to a second node;
third and fourth PMOS transistors connected in parallel between the second power supply voltage and the second node, the third PMOS transistor having a gate electrode connected to the first node, the fourth PMOS transistor having a gate electrode receiving the inverted first pulse voltage;
first and second NMOS transistors in series between the first node and a third node, the first NMOS transistor having a gate electrode connected to the second node, the second NMOS transistor having a gate electrode receiving the first reference voltage;
third and fourth NMOS transistors in series between the second node and the third node, the third NMOS transistor having a gate electrode connected to the first node, the fourth NMOS transistor having a gate electrode receiving the glitch voltage;
a fifth NMOS transistor connected between the third node and a ground voltage, and having a gate electrode receiving the first pulse voltage; and
a first inverter configured to generate the first detection voltage by inverting a voltage at the second node.

8. The glitch detector of claim 2, wherein the sensing circuit includes:
a first circuit configured to generate the glitch voltage based on the first power supply voltage; and
a second circuit configured to generate the first reference voltage based on the first power supply voltage.

9. The glitch detector of claim 8, wherein the first circuit includes:
a first resistor and a first capacitor connected in parallel between the first power supply voltage and a first node outputting the glitch voltage; and
a second resistor and a second capacitor connected in parallel between the first node and a ground voltage.

10. The glitch detector of claim 9, wherein the second circuit includes:
a third resistor connected between the first power supply voltage and a second node;
a fourth resistor connected between the second node and the ground voltage;
a fifth resistor connected between the second node and a third node outputting the first reference voltage; and
a third capacitor connected between the third node and a ground voltage.

11. The glitch detector of claim 1, wherein the glitch-to-pulse generation circuit includes:
a first glitch-to-pulse generating circuit configured to generate a first pulse voltage in response to sensing a down-glitch lower than a first reference voltage.

12. The glitch detector of claim 11, wherein the first glitch-to-pulse generating circuit includes:
a first circuit configured to generate a first sensing voltage based on a first reference current, a second power supply voltage and one of the first power supply voltage and the glitch voltage, the first sensing voltage being activated in response to the occurrence of the down-glitch on the first power supply voltage.

13. The glitch detector of claim 12, wherein the first circuit includes:
a first PMOS transistor connected between the second power supply voltage and a first node, and having a gate electrode connected to the first node;
a second PMOS transistor connected between the second power supply voltage and a second node, and having a gate electrode connected to the first node;
a third PMOS transistor connected between the second power supply voltage and a third node outputting the first sensing voltage, and having a gate electrode;

a first current source connected between the first node and a ground voltage, and configured to generate the first reference current;

a first NMOS transistor connected between the second node and the ground voltage, and having a gate electrode connected to the second node;

a second NMOS transistor connected between the third node and the ground voltage, and having a gate electrode connected to the second node;

a first resistor connected between the first node and the gate electrode of the third PMOS transistor; and a first capacitor connected between the gate electrode of the third PMOS transistor and one of the first power supply voltage and the glitch voltage.

14. The glitch detector of claim 12, wherein the first glitch-to-pulse generating circuit further includes:

a first delay circuit configured to generate the first pulse voltage by delaying an output of the first glitch-to-pulse generating circuit.

15. The glitch detector of claim 1, wherein the glitch-to-pulse generation circuit includes:

a first glitch-to-pulse generating circuit configured to generate a first pulse voltage in response to sensing an up-glitch higher than a first reference voltage; and a second glitch-to-pulse generating circuit configured to generate a second pulse voltage in response to sensing a down-glitch lower than a second reference voltage lower than the first reference voltage.

16. The glitch detector of claim 15, wherein the comparing circuit includes:

a first latch-type comparator configured to generate a first detection voltage by comparing the glitch voltage with the first reference voltage only when the pulse of the first pulse voltage is received by the first latch-type comparator; and a second latch-type comparator configured to generate a second detection voltage by comparing the glitch voltage with the second reference voltage only when the pulse of the second pulse voltage is received by the second latch-type comparator.

17. The glitch detector of claim 15, wherein the sensing circuit includes:

a first circuit configured to generate the glitch voltage based on the first power supply voltage;

a second circuit configured to generate the first reference voltage based on the first power supply voltage; and a third circuit configured to generate the second reference voltage based on the first power supply voltage.

18. The glitch detector of claim 1, wherein:

the glitch detector is not configured to receive a clock signal that periodically toggles between a first voltage level and a second voltage level, and an amount of static current consumption by the glitch detector is less than a predetermined amount of current.

19. A security device comprising:

a security memory configured to store security data;

a security processor configured to process the security data, and to be reset based on a reset signal;

a glitch detector configured to generate at least one detection voltage that is activated when a glitch occurs on a first power supply voltage; and a reset signal generation circuit configured to generate the reset signal in response to activation of the at least one detection voltage, wherein the glitch detector includes:

a sensing circuit configured to generate a glitch voltage and at least one reference voltage based on the first power supply voltage;

a glitch-to-pulse generation circuit configured to receive at least one of the first power supply voltage and the glitch voltage, and to generate a pulse of a pulse voltage including in response to an occurrence of the glitch on the first power supply voltage; and a comparing circuit configured to generate the at least one detection voltage by comparing the glitch voltage with the at least one reference voltage in response to the pulse of the pulse voltage.

20. A glitch detector comprising:

a sensing circuit configured to generate a glitch voltage based on a first power supply voltage;

a reference voltage generating circuit configured to generate at least one of a first reference voltage and a second reference voltage based on the first power supply voltage;

a glitch-to-pulse generation circuit configured to receive at least one of the first power supply voltage and the glitch voltage, and to generate a pulse in response to an occurrence of the glitch on the first power supply voltage; and a comparing circuit configured to compare the glitch voltage with at least one of the first and second reference voltages in response to receiving the pulse, wherein the glitch-to-pulse generation circuit includes at least one of a first glitch-to-pulse generating circuit and a second glitch-to-pulse generating circuit, wherein the first glitch-to-pulse generating circuit is configured to generate the pulse as part of a first pulse voltage in response to sensing an up-glitch higher than the first reference voltage, wherein the second glitch-to-pulse generating circuit is configured to generate the pulse as part of a second pulse voltage in response to sensing a down-glitch lower than the second reference voltage, wherein the comparing circuit includes at least one of a first latch-type comparator and a second latch-type comparator, wherein the first latch-type comparator is configured to generate a first detection voltage by comparing the glitch voltage with the first reference voltage only when the pulse as part of the first pulse voltage is received by the first latch-type comparator, and wherein the second latch-type comparator is configured to generate a second detection voltage by comparing the glitch voltage with the second reference voltage only when the pulse as part of the second pulse voltage is received by the second latch-type comparator.

* * * * *